(12) United States Patent
Neal et al.

(10) Patent No.: US 9,137,389 B2
(45) Date of Patent: *Sep. 15, 2015

(54) MASTER LIMITS AND FILTERS FOR ELECTRONIC DEVICES

(71) Applicant: Kajeet, Inc., Bethesda, MD (US)

(72) Inventors: Daniel J. Neal, Chevy Chase, MD (US); Ben J. Weintraub, Vienna, VA (US); Michael M. Flood, Lawrenceville, GA (US); Nicholas A. Segalla, Washington, DC (US); David Pinto, Rockville, MD (US)

(73) Assignee: KAJEET, INC., McLean, VA (US)

( * ) Notice: Subject to any disclaimer, the term of this patent is extended or adjusted under 35 U.S.C. 154(b) by 121 days.

This patent is subject to a terminal disclaimer.

(21) Appl. No.: 14/014,167

(22) Filed: Aug. 29, 2013

(65) Prior Publication Data

US 2014/0038546 A1 Feb. 6, 2014

Related U.S. Application Data

(63) Continuation-in-part of application No. 13/672,607, filed on Nov. 8, 2012, now Pat. No. 8,929,857.

(60) Provisional application No. 61/694,730, filed on Aug. 29, 2012, provisional application No. 61/557,372, filed on Nov. 8, 2011.

(51) Int. Cl.
*H04M 11/00* (2006.01)
*H04M 17/00* (2006.01)
(Continued)

(52) U.S. Cl.
CPC .............. *H04M 17/10* (2013.01); *G06Q 10/103* (2013.01); *G06Q 20/322* (2013.01); *G06Q 20/3224* (2013.01); *G06Q 20/405* (2013.01); *G06Q 30/0273* (2013.01)

(58) Field of Classification Search
CPC ........ H04W 4/24; H04W 12/08; H04W 12/12
USPC ............... 455/405–408, 410, 411; 705/52, 53
See application file for complete search history.

(56) References Cited

U.S. PATENT DOCUMENTS

| | | |
|---|---|---|
| 5,221,838 A | 6/1993 | Gutman et al. |
| 5,285,382 A | 2/1994 | Muehlberger et al. |

(Continued)

FOREIGN PATENT DOCUMENTS

| | | |
|---|---|---|
| AU | 2006100397 A4 | 3/2007 |
| EP | 0137884 A1 | 7/1983 |

(Continued)

OTHER PUBLICATIONS

U.S. Appl. No. 13/744,342, filed Jan. 17, 2013, Neal.

(Continued)

*Primary Examiner* — Temica M Beamer
(74) *Attorney, Agent, or Firm* — Baker & Hostetler LLP

(57) ABSTRACT

A master account system for managing one or more electronic devices through the establishment and enforcement of policies associated with the devices. Enforcement policies may be determined by characteristics of space, time and/or other criteria relating to a user(s) and/or administrator(s), or in relation to one another, or some other general circumstance. The master account may be established on a pre-paid or postpaid basis with limits applied in real-time or near-real-time. The policies may apply across any number of devices associated with the master account. The addition and decrement of units of measure associated with the master account and device account(s) may be limited to the master account, to the master account and one or more device accounts at the same time, or allocated in numerous other ways. Content and other activity filtering may also be established and managed at the master account and/or device account level.

26 Claims, 14 Drawing Sheets

(51) Int. Cl.
  *G06Q 10/10* (2012.01)
  *G06Q 20/32* (2012.01)
  *G06Q 20/40* (2012.01)
  *G06Q 30/02* (2012.01)

(56) References Cited

U.S. PATENT DOCUMENTS

| | | |
|---|---|---|
| 5,704,046 A | 12/1997 | Hogan |
| 5,914,472 A | 6/1999 | Foladare et al. |
| 5,953,710 A | 9/1999 | Fleming |
| 6,018,724 A | 1/2000 | Arent |
| 6,026,291 A | 2/2000 | Carlsson et al. |
| 6,076,075 A | 6/2000 | Teicher |
| 6,173,269 B1 | 1/2001 | Solokl et al. |
| 6,205,436 B1 | 3/2001 | Rosen |
| 6,345,263 B1 | 2/2002 | Matsumoto et al. |
| 6,564,047 B1 | 5/2003 | Steele et al. |
| 6,885,877 B1 | 4/2005 | Ozaki et al. |
| 6,957,058 B2 | 10/2005 | Chan et al. |
| 6,990,182 B2 | 1/2006 | Nelson |
| 7,024,174 B2 | 4/2006 | Nagy et al. |
| 7,024,390 B1 | 4/2006 | Mori et al. |
| 7,133,846 B1 | 11/2006 | Ginter et al. |
| 7,155,411 B1 | 12/2006 | Blinn et al. |
| 7,206,769 B2 | 4/2007 | Laurent et al. |
| 7,209,957 B2 | 4/2007 | Patron et al. |
| 7,248,855 B2 | 7/2007 | Joyce et al. |
| 7,249,092 B2 | 7/2007 | Dunn et al. |
| 7,302,272 B2 | 11/2007 | Ackley |
| 7,330,717 B2 | 2/2008 | Gidron et al. |
| 7,333,796 B2 | 2/2008 | Scalisi et al. |
| 7,359,880 B2 | 4/2008 | Abel et al. |
| 7,434,723 B1 | 10/2008 | White et al. |
| 7,457,609 B2 | 11/2008 | Cai |
| 7,516,219 B2 | 4/2009 | Moghaddam et al. |
| 7,580,699 B1 | 8/2009 | Shaw et al. |
| 7,593,714 B2 | 9/2009 | Schultz et al. |
| 7,869,790 B2 | 1/2011 | Singh et al. |
| 7,869,792 B1 | 1/2011 | Zhou et al. |
| 7,881,697 B2 | 2/2011 | Baker |
| 7,899,438 B2 | 3/2011 | Baker |
| 7,945,238 B2 | 5/2011 | Baker |
| 7,945,242 B2 | 5/2011 | Kahn |
| 8,019,354 B2 | 9/2011 | Rae et al. |
| 8,068,825 B2 | 11/2011 | Mikan et al. |
| 8,078,140 B2 | 12/2011 | Baker |
| 8,285,249 B2 | 10/2012 | Baker |
| 2001/0007983 A1 | 7/2001 | Lee |
| 2001/0011250 A1 | 8/2001 | Paltenghe et al. |
| 2001/0032192 A1 | 10/2001 | Putta et al. |
| 2001/0047310 A1 | 11/2001 | Russell |
| 2002/0022472 A1 | 2/2002 | Watler et al. |
| 2002/0055911 A1 | 5/2002 | Guerreri |
| 2002/0101966 A1 | 8/2002 | Nelson |
| 2002/0123938 A1 | 9/2002 | Yu et al. |
| 2002/0176553 A1 | 11/2002 | Aschir |
| 2002/0178118 A1 | 11/2002 | Hamilton et al. |
| 2002/0179704 A1 | 12/2002 | Deaton |
| 2002/0187772 A1 | 12/2002 | Hyyppa et al. |
| 2002/0193102 A1 | 12/2002 | Hyyppa et al. |
| 2003/0026404 A1 | 2/2003 | Joyce et al. |
| 2003/0055785 A1 | 3/2003 | Lahiri |
| 2003/0083954 A1 | 5/2003 | Namba |
| 2003/0182420 A1 | 9/2003 | Jones et al. |
| 2003/0220835 A1 | 11/2003 | Barnes, Jr. |
| 2004/0111329 A1 | 6/2004 | Moore |
| 2004/0132438 A1 | 7/2004 | White |
| 2004/0139018 A1 | 7/2004 | Anderson et al. |
| 2004/0143550 A1 | 7/2004 | Creamer et al. |
| 2004/0153407 A1 | 8/2004 | Clubb |
| 2004/0198335 A1 | 10/2004 | Campen |
| 2004/0229600 A1 | 11/2004 | Saez et al. |
| 2004/0235457 A1 | 11/2004 | Florkey et al. |
| 2004/0236688 A1 | 11/2004 | Bozeman |
| 2004/0253941 A1 | 12/2004 | Rivera et al. |
| 2005/0013423 A1 | 1/2005 | Eversen et al. |
| 2005/0096009 A1 | 5/2005 | Ackley |
| 2005/0113130 A1 | 5/2005 | Weinzierl |
| 2005/0171715 A1 | 8/2005 | Saitoh et al. |
| 2005/0216424 A1 | 9/2005 | Gandre et al. |
| 2005/0282559 A1 | 12/2005 | Erskine et al. |
| 2006/0019632 A1 | 1/2006 | Cunningham et al. |
| 2006/0025139 A1 | 2/2006 | Bales et al. |
| 2006/0116105 A1 | 6/2006 | Frankel et al. |
| 2006/0135140 A1 | 6/2006 | Rothman et al. |
| 2006/0252410 A1 | 11/2006 | Bakita et al. |
| 2006/0276180 A1 | 12/2006 | Henry, Jr. |
| 2006/0293057 A1 | 12/2006 | Mazerski et al. |
| 2007/0003034 A1 | 1/2007 | Schultz et al. |
| 2007/0004386 A1 | 1/2007 | Singh et al. |
| 2007/0021102 A1 | 1/2007 | Sherman |
| 2007/0058812 A1 | 3/2007 | Ali et al. |
| 2007/0060100 A1 | 3/2007 | Watler et al. |
| 2007/0077911 A1 | 4/2007 | Raman |
| 2007/0095892 A1 | 5/2007 | Lyons et al. |
| 2007/0099609 A1 | 5/2007 | Cai |
| 2007/0105529 A1 | 5/2007 | Lundstrom et al. |
| 2007/0125840 A1 | 6/2007 | Law et al. |
| 2007/0135135 A1 | 6/2007 | Brown |
| 2007/0155364 A1 | 7/2007 | Andersson |
| 2007/0164098 A1 | 7/2007 | Khalid et al. |
| 2007/0172039 A1 | 7/2007 | Mendiola et al. |
| 2007/0179974 A1 | 8/2007 | Cai et al. |
| 2007/0198432 A1 | 8/2007 | Pitroda et al. |
| 2007/0243862 A1 | 10/2007 | Coskun et al. |
| 2007/0245026 A1 | 10/2007 | Martin et al. |
| 2007/0267479 A1 | 11/2007 | Nix et al. |
| 2007/0277230 A1 | 11/2007 | Hawkins et al. |
| 2008/0014904 A1 | 1/2008 | Crimi et al. |
| 2008/0033880 A1 | 2/2008 | Fiebiger et al. |
| 2008/0039189 A1 | 2/2008 | Walker et al. |
| 2008/0096524 A1 | 4/2008 | True et al. |
| 2008/0119162 A1 | 5/2008 | Sivalingam et al. |
| 2008/0130849 A1 | 6/2008 | Mock et al. |
| 2008/0146211 A1 | 6/2008 | Mikan et al. |
| 2008/0146259 A1 | 6/2008 | Chin et al. |
| 2008/0312968 A1 | 12/2008 | Hannon et al. |
| 2009/0119132 A1 | 5/2009 | Bolano et al. |
| 2010/0064341 A1 | 3/2010 | Aldera |
| 2012/0044807 A1 | 2/2012 | Johnson et al. |
| 2012/0149337 A1 | 6/2012 | Singh et al. |
| 2013/0029653 A1 | 1/2013 | Baker |
| 2013/0183937 A1 | 7/2013 | Neal |

FOREIGN PATENT DOCUMENTS

| | | |
|---|---|---|
| EP | 0172670 A2 | 2/1986 |
| EP | 1041520 A2 | 4/2000 |
| EP | 1072997 A1 | 1/2001 |
| EP | 1132839 A1 | 9/2001 |
| EP | 1450322 | 8/2004 |
| EP | 1528513 | 4/2005 |
| EP | 1798659 A1 | 6/2007 |
| EP | 1798943 A1 | 6/2007 |
| FR | 2863088 B2 | 6/2005 |
| GB | 2419970 A | 5/2006 |
| GB | 2425621 | 11/2006 |
| GB | 2431072 A | 4/2007 |
| JP | 59062976 A | 4/1984 |
| JP | 9-179921 A | 7/1997 |
| JP | 9-185658 A | 7/1997 |
| JP | 12-48144 A | 2/2000 |
| JP | 12-251154 A | 9/2000 |
| JP | 12-331100 A | 11/2000 |
| JP | 13-134689 A | 5/2001 |
| JP | 13-291039 A | 10/2001 |
| JP | 15-209880 A | 7/2003 |
| JP | 16-102726 A | 4/2004 |
| JP | 18-139433 A | 6/2006 |
| JP | 18-309786 A | 11/2006 |
| JP | 19-323337 A | 12/2007 |
| KR | 2001088369 A | 9/2001 |
| KR | 2002010160 A | 2/2002 |
| KR | 2002016161 A | 3/2002 |

(56) References Cited

FOREIGN PATENT DOCUMENTS

| | | | |
|---|---|---|---|
| KR | 2003044475 A | 6/2003 | |
| KR | 2004089144 A | 10/2004 | |
| KR | 2005048166 A | 5/2005 | |
| KR | 2007018329 A | 2/2007 | |
| WO | WO 01/35353 | 5/2001 | |
| WO | WO 02/084989 A2 | 10/2002 | |
| WO | WO 03092348 A2 | 11/2003 | |
| WO | WO 2004/100094 A2 | 11/2004 | |
| WO | WO 2005/015831 A2 | 2/2005 | |
| WO | WO 2005/017793 A1 | 2/2005 | |
| WO | WO 2005/081664 | 9/2005 | |

OTHER PUBLICATIONS

U.S. Appl. No. 13/786,735, filed Mar. 6, 2013, Baker.
U.S. Appl. No. 13/786,754, filed Mar. 6, 2013, Baker.
U.S. Appl. No. 13/786,775, filed Mar. 6, 2013, Baker.
U.S. Appl. No. 13/786,788, filed Mar. 6, 2013, Baker.
U.S. Appl. No. 13/786,802, filed Mar. 6, 2013, Baker.
U.S. Appl. No. 13/786,685, filed Mar. 6, 2013, Baker.
U.S. Appl. No. 13/786,694, filed Mar. 6, 2013, Baker.
U.S. Appl. No. 13/786,703, filed Mar. 6, 2013, Baker.
U.S. Appl. No. 13/786,730, filed Mar. 6, 2013, Baker.
U.S. Appl. No. 13/786,745, filed Mar. 6, 2013, Baker.
U.S. Appl. No. 13/786,922, filed Mar. 6, 2013, Baker.
U.S. Appl. No. 13/786,950, filed Mar. 6, 2013, Baker.
U.S. Appl. No. 13/786,966, filed Mar. 6, 2013, Baker.
U.S. Appl. No. 13/786,986, filed Mar. 6, 2013, Baker.
U.S. Appl. No. 13/787,004, filed Mar. 6, 2013, Baker.
U.S. Appl. No. 13/786,917, filed Mar. 6, 2013, Baker.
U.S. Appl. No. 13/786,949, filed Mar. 6, 2013, Baker.
U.S. Appl. No. 13/763,348, filed Feb. 8, 2013, Baker.
U.S. Appl. No. 13/786,974, filed Mar. 6, 2013, Baker.
U.S. Appl. No. 13/787,610, filed Mar. 6, 2013, Baker.
U.S. Appl. No. 13/787,111, filed Mar. 6, 2013, Baker.
Boyd, "Here Comes the Wallet Phone", IEEE Spectrum, Nov. 2005, pp. 12-14, www.spectrum.ieee.org.
Carstens, "Mechanism for Compiling Payment Information on Mobile Terminals", Jun. 2005, IP.com, #IPCOM000124834D.
Diesposti et al., "Dual-Use Personal NavCom Service", IEEE 2000, pp. 69-79, 0-7803-5846-5/00.
Ebringer et al., "Parasitic Authentication to Protect Your E-Wallet", IEEE Computer Oct. 2000, pp. 54-60, 0018-9162/00.
Hung et al, "Security and Privacy Aspects of SmartFlow Internet Payment System", IEEE 1999.
IBM TDB, "Micropayment Scheme", IP.com, #IPCOM000013249D, originally published Apr. 1, 2001, IP.com published Jun. 18, 2003.
Integrated Mobile, Inc., Family-friendly Mobile Services, Presentation, Executive Overview, Nov. 10, 2003, 1-39.
Ishikawa et al., "Mixed-Reality 'Party-Line Night Club'—Synchronization of Networked Avatars and Applications with Mobile Phone Ringtones: Integrating Java3d and LAN-tap Roomware with J2ME", Proceedings of the 2005 the Fifth International Conference on Computer and Information Technology (CIT'05), IEEE 2005, 0-7695-2432-X/05.
Kostov et al., "Cellular Phone Ringing Tone Recommendation System Based on Collaborative Filtering Method", IEEE 2003, pp. 378-383, 0-7803-7866-0/03.
Labrou et al, "Wireless Wallet", Proceedings of the First Annual International conference on Moibile and Ubiquitious Sustems: Networking and Services, 2004.
Lee et al.. "i-Ring: A System for Humming Transcription and Chord Generation". IEEE 2004, pp. 1031-1034, 0-7803-8603-5/04.
Leung et al., "On Designing a Flexible E-Payment System with Fraud Detection Capability", IEEE 2004, Proceedings of the IEEE International Conference on E-Commerce Technology, 0-7695-2098-7/04.
Me et al, "EC-Pay: An Efficient and Secure ECC-based Wireless Local Payment Scheme", Proceedings of the Third International Conference on Information Technology and Applications 2005.
Mjolsnes et al., "On-line E-Wallet System with Decentralized Credential Keepers", Mobile Networks and Applications 8, pp. 87-99, published by Kluwer Academic Publishers, 2003.
Pierce et al., "RF Wallet With Fraud Protection", IP.com, #IPCOM000009305D, originally published Jun. 1, 1999, IP.com published Aug. 15, 2002.
Raposo et al, "A Web Agent for Automating E-commerce Operations", Proceedings of the IEEE International Conference on E-Commerce 2003.
Schmandt et al., "Impromptu: Managing Networked Audio Applications for Mobile Users", ACM 2004, pp. 59-69, 1-58113-793-Jan. 4, 2006.
Tang et al., "Distributed Family Wallet Architecture and Secure Inter-Purse Operations", IEEE 2000, pp. 110-111, 0-7803-6301-9/00.
Varshney, "Location Management for Mobile Commerce Applications in Wireless Internet Environment", ACM Transactions on Internet Technology, vol. 3, No. 3, Aug. 2003, pp. 236-255.
Yang et al, "A Three-Party Authenticated Key Exchange Scheme Smartcard using Elliptic Curve Cryptosystem for Secure Key Exchange in Wireless Sensor Network", IEEE, 2007.
Lennox, "Feature Interaction in Internet Telephony," Sixth Feature Interaction Workshop, Columbia University, May 17, 2000, 15 pages.
Creus et al., "Feature Interaction Control on Smartphones", 2007, IEEE, pp. 302-309.
U.S. Appl. No. 13/603,218: Non-Final Office Action dated Dec. 24, 2012, 6 pages.
U.S. Appl. No. 13/603,218: Final Office Action dated Jun. 10, 2013, 15 pages.
U.S. Appl. No. 13/786,735: Non-Final Office Action dated Jun. 7, 2013, 42 pages.
U.S. Appl. No. 13/786,754: Non-Final Office Action dated Jun. 4, 2013, 36 pages.
U.S. Appl. No. 13/786,775: Non-Final Office Action dated Jun. 5, 2013, 26 pages.
U.S. Appl. No. 13/786,788: Non-Final Office Action dated Jun. 28, 2013, 24 pages.
U.S. Appl. No. 13/786,802: Non-Final Office Action dated Jul. 2, 2013, 9 pages.
U.S. Appl. No. 13/786,685: Non-Final Office Action dated Jun. 14, 2013, 23 pages.
U.S. Appl. No. 13/786,694: Non-Final Office Action dated Jun. 20, 2013, 25 pages.
U.S. Appl. No. 13/786,703: Non-Final Office Action dated Jun. 28, 2013, 34 pages.
U.S. Appl. No. 13/786,730: Non-Final Office Action dated Jul. 17, 2013, 30 pages.
U.S. Appl. No. 13/786,745: Non-Final Office Action dated May 31, 2013, 33 pages.
U.S. Appl. No. 13/786,922: Non-Final Office Action dated Jun. 20, 2013, 25 pages.
U.S. Appl. No. 13/786,950: Non-Final Office Action dated Jun. 20, 2013, 28 pages.
U.S. Appl. No. 13/786,966: Non-Final Office Action dated Jun. 20, 2013, 30 pages.
U.S. Appl. No. 13/786,986: Non-Final Office Action dated Jun. 5, 2013, 23 pages.
U.S. Appl. No. 13/787,004: Non-Final Office Action dated Aug. 5, 2013, 25 pages.
U.S. Appl. No. 13/786,917: Non-Final Office Action dated Aug. 5, 2013, 17 pages.
U.S. Appl. No. 13/786,949: Non-Final Office Action dated Aug. 5, 2013, 17 pages.
U.S. Appl. No. 13/763,348: Non-Final Office Action dated Jun. 21, 2013, 21 pages.
U.S. Appl. No. 13/786,974: Non-Final Office Action dated Jul. 5, 2013, 22 pages.
U.S. Appl. No. 13/787,610: Non-Final Office Action dated Jul. 19, 2013, 21 pages.
U.S. Appl. No. 13/786,754: Notice of Allowance dated Oct. 18, 2013, 12 pages.
U.S. Appl. No. 13/786,775: Notice of Allowance dated Sep. 24, 2013, 6 pages.

(56) References Cited

OTHER PUBLICATIONS

U.S. Appl. No. 13/786,802: Notice of Allowance dated Nov. 1, 2013, 7 pages.
U.S. Appl. No. 13/786,745: Notice of Allowance dated Sep. 16, 2013, 6 pages.
U.S. Appl. No. 13/603,218: Non-Final Office Action dated Nov. 27, 2013, 12 pages.
U.S. Appl. No. 13/786,685: Non-Final Office Action dated Jan. 2, 2014, 30 pages.
U.S. Appl. No. 13/786,703: Notice of Allowance dated Nov. 25, 2013, 34 pages.
U.S. Appl. No. 13/786,730: Notice of Allowance dated Dec. 18, 2013, 15 pages.
U.S. Appl. No. 13/786,922: Notice of Allowance dated Dec. 6, 2013, 12 pages.
U.S. Appl. No. 13/786,950: Notice of Allowance dated Dec. 11, 2013, 12 pages.
U.S. Appl. No. 13/787,004: Notice of Allowance dated Dec. 10, 2013, 12 pages.
U.S. Appl. No. 13/763,348: Notice of Allowance dated Dec. 9, 2013, 12 pages.
U.S. Appl. No. 13/787,610: Notice of Allowance dated Dec. 16, 2013, 12 pages.
U.S. Appl. No. 13/787,111: Non-Final Office Action dated Nov. 12, 2013, 17 pages.
U.S. Appl. No. 13/786,735: Non-Final Office Action dated Jan. 29, 2014, 37 pages.
U.S. Appl. No. 13/786,694: Non-Final Office Action dated Feb. 4, 2014, 31 pages.

Daniel's Account
You have $70.53 in your account
Refill / See Activity
Learn about my account

ACCOUNT OVERVIEW — 34

Eleanor
301-XXX-XXXX
Account Balance: $0.00
Log in as Eleanor
Low Balance Alert
Refill now
Set up auto refill Ryan
240-XXX-XXXX
Account Balance: $13.76
Log in as Ryan Steve
775-XXX-XXXX
Account Balance: $29.95
Log in as Steve See all accounts

32 / 30

CONTACT MANAGER
Use the Contact Manager to:
Allow or block calls and text messages from specific phone number. <u>Tell me more</u>
Decide whose account pays for specific calls and text messages. <u>Tell me more</u>

Steve's Contact — 35

36 — Allow Calls/Texts? | Who Pays? (Master Steve Accnt / Steve Accnt / Grandma Accnt) — 40

| Contact | | | Allow Calls/Texts? | | | Who Pays? | | |
|---|---|---|---|---|---|---|---|---|
| Update | Name | Number | Yes | No | Override Restrictions | Master Steve Accnt | Steve Accnt | Grandma Accnt |
| <u>Edit</u> <u>Remove</u> | jack | 301-555-5555 | ◉ | | | ◉ | | |
| <u>Edit</u> <u>Remove</u> | jeff | 240-555-5555 | | ◉ | | ◉ | | |
| <u>Edit</u> <u>Remove</u> | All Other Numbers | | | | ◉ | ◉ | | |
| <u>Edit</u> <u>Remove</u> | jane | 240-555-5555 | ◉ | | | ◉ | | |

<u>Save settings</u>     <u>Add new contacts</u> — 42

| ◉ | 911 Calls | 911 | Emergency calls to 911 are always free |
| ◉ | Customer Care | 866-4kajeet | Calls to kajeet are always free |
| ◉ | 900-# Calls | 900-XXX-XXXX | 900-number calls are always free |

| FEATURE MANAGER |
|---|
| To use the Feature Manager, first select the appropriate child on your account; |
| Show features for [Mike ▽] [Go] |
| Feature Selections for Mike |
| Here you can select the features that Mike can use on his kajeet phone. To change the setting for a particular feature, click the appropriate "Edit Setting" link. |
| Ringtones, Wallpaper, games & Applications    Allowed    Edit Settings |
| Ringtones, wallpaper, games and application are all files that can be downloaded to your child's phone. Ringtones and wallpaper allow your kid to personalize the phone and games and application entertain or enable your kid to do something (E.G. GoogleMaps can help your kid find their way.) |
| Feeds    Allowed    Edit Settings |
| Feeds enable your child to receive text messages for a particular topic, sent by kajeet. For example, kajeet offers sports, horoscopes and other feeds. Kajeet text messaging rates apply. |
| Mobile Web Surfing    Not Allowed    Edit Settings |
| Your child can surf the mobile web from the kajeet phone to check email or other web sites. |
| Picture Messaging    Allowed    Edit Settings |
| With picture messaging your child can snap a picture with a kajeet camera phone and send it in a picture message to a friend, or receive picture messages. |
| Instant Messaging    Unlimited Monthly    Edit Settings |
| With AOL Instant Messaging on your kajeet phone, you can send unlimited Instant messages to anyone anywhere anytime. |

50, 52, 54, 56, 58, 60

Permissions

Manage how Bens Conquer can access and/or purchase the various features listed below. Click the "Save Settings" button at the bottom of the page to change the status of these features.

Mobile-Web - Decide how much cellular data web access to give to your kid for surfing.

Choose one of the following mobile web access* options for your smartphone device.

*Please note that this filtering only applies to cellular data access and will not function when the device is connected via Wi-Fi.

○ All Traffic off : Your kid won't be able to reach any websites or applications that require data usage ○ Open Internet : All content filtering is disabled (Surf at your own risk!)

⦿ Kajeet Smart Blocker™ : Use this new web filtering tool to decide which types of sites your kid can access!

Choose from these options below.

| Website Categories** | | select ○ College and Above | select ○ High School | select ○ Middle School | select ○ K-5th Grade | select ⦿ Strict Filtering |
|---|---|---|---|---|---|---|
| Unsecured Sites | (learn more) | blocked | blocked | blocked | blocked | blocked |
| Inappropriate Searches | (learn more) | | blocked | blocked | blocked | blocked |
| Pornography & Adult Sites | (learn more) | | blocked | blocked | blocked | blocked |
| Extreme | (learn more) | | blocked | blocked | blocked | blocked |
| Illegal & Illicit Content | (learn more) | | blocked | blocked | blocked | blocked |
| Substance Abuse and Alcohol | (learn more) | | blocked | blocked | blocked | blocked |
| Profanity | (learn more) | | | blocked | blocked | blocked |
| Social Networking | (learn more) | | | | blocked | blocked |
| IM, Web Chat & Email | (learn more) | | | | blocked | blocked |
| Entertainment & Games | (learn more) | | | | | blocked |
| Android Market | (learn more) | | | | | blocked |
| (All Other Websites) | | | | | | blocked |

** Please note: Website Categories will change over time as new and existing URLs get re-categorized based on their site content.

[SAVE SETTINGS]

FIG. 4B

Feeds

Feeds enable your child to receive text messages for a particular topic, Sent by kajeet. For example, kajeet offers sports, horoscopes and other feeds. Kajeet text messaging rates apply. Note: selecting "Not allowed" disables all text messaging.

Do you want Mike to be able to subscribe to feeds?

◎ Allowed

◎ Not Allowed

| Save Settings |

Add money to your account right now...
This is where you put the "pay" in "pay as you go." Use your credit card to add money to any account right now.

It's as easy as 1, 2, 3:   Want to know more about accounts?

1. Whose account do you want to refill? _____
2. How much do you want to add? _____
3. Do you want to pay by credit card or transfer money from another account ? _____

<u>Add money now</u>

{ 80

... or set up an automatic refill
Setting up automatic refills lets you manage your accounts on a budget and schedule that's right for you!

Set up a new automatic refill:

Whose account do you want to refill? _____

Whose account do you want to refill? _____

How much do you want to add? _____

Add _____ whenever this account has less that _____

Add _____ every month on _____

Add _____ every week on _____

Pay with the following credit card on file: _____

<u>Update credit card</u> ~84     86 ~ <u>Submit automatic refill</u>

Give the gift of an account refill

Anyone with a kajeet phone would love to receive a refill as a gift, so you've come to the right place!

All about your generous gift:

Refill an account

Enter the number of the kajeet phone you're gifting with a refill: _____

How much are you sending as a gift: _____

The lucky recipient of this gift will want to know who sent it, so enter your name in the space below: _____

Enter a message in the space below for the recipient: _____

Please review all information carefully before clicking "Buy Now".

CANCEL        BUY NOW

---

Payment Information

Your email address: _____

Select payment option: _____

Enter card number: _____

Security code: _____

First name of cardholder: _____

Last name of cardholder: _____

Address: _____

City: _____

State: _____

Postal Code: _____

MASTER LIMITS AND FILTERS FOR ELECTRONIC DEVICES

CROSS REFERENCE TO RELATED APPLICATIONS

This application claims benefit under 35 U.S.C. §119(e) of Provisional Application No. 61/694,730, filed Aug. 29, 2012, the entire contents are incorporated herein by reference.

This application is a continuation-in-part of U.S. application Ser. No. 13/672,607, filed Nov. 8, 2012, which claims benefit under 35 U.S.C. §119(e) of Provisional Application No. 61/557,372, filed Nov. 8, 2011, the entire contents of which are incorporated herein by reference in their entirety.

BACKGROUND

Postpaid cellular phone (cell phone) and other types of wireless services typically allow the user of a cell phone or other product to spend unlimited amounts of money for services. In other words, there is nothing to stop the user from running up a huge bill. Many parents and employers have experienced this issue with children and employees, prompting parents and employers to take away phones or devices from children/employees or to otherwise restrict access to the phones or devices, collectively referred to as cellular phones, cell phones, smart phones and/or mobile devices herein. Smartphones and other digital devices also allow users to access a wide variety of content and applications, some of which may be inappropriate for the user (e.g., pornographic, malware, gambling, not business related, etc.) or the environment (e.g., during school, at the office, etc.).

One partial solution to the problems associated with postpaid cellular phone abuse is the prepaid cellular phone or device. Prepaid phone services limit spending because the user of the phone can only use what has been paid (or allocated) for in advance. Many users, however, are not responsible or mature enough to adequately track and maintain their prepaid phone service accounts, and many parents/employers have too many other obligations to keep close track of their children's/employee's detailed device usage so as to make sure service accounts are adequately and appropriately funded all of the time. The net result can be disastrous. For example, if a child uses up all of the units in their prepaid account, and their phone service provider shuts down access to its services, the child will not be able to call a parent in the event of an emergency, or arrange to be picked up after school or a sporting event, etc.

Thus, a prepaid phone service does not solve the problem of ensuring availability of key services even if the prepaid account has run out of money. In addition to insuring the safety of their children, many parents, employers and others would like to be able to exercise administrative control over the services and activities that a child, employee, etc., is allowed to pay for out of their prepaid account, but prepaid and postpaid accounts have heretofore not been structured to provide such administrative control or feature management. Feature management can encompass many activities, such as preventing one or more features or services from being used entirely, limiting how much a particular feature or service can be used in a given time period, limiting the other party or parties with whom the feature may be used, limiting where a feature or features may be used or content consumed, limiting when a given feature or service can be used (i.e. time of day, days in month, etc.), or some combination of these.

Some prior attempts by prepaid and postpaid service providers to address these problems have only resulted in partial solutions. Some service providers have provided for rollover usage minutes, which are minutes that were not used as part of a user's service plan and are allowed to roll over to the same user for use in the next month. In some cases, this might prevent a user from running out of minutes in the next month, but it does not guarantee that the user will not use up all of their monthly minutes, plus the rollover minutes, and be denied access to key services anyway. Other service providers have provided an automated refill service, which automatically bills some amount to a credit card to recharge the user's prepaid account in the event the balance in the user's account gets too low. However, a prepaid phone service with an automated refill service is the equivalent of a postpaid phone service and would therefore have the same problem with potential abuse as a postpaid service. In other words, there is no spending limit on the phone or device service.

Postpaid services have also attempted to address these problems by offering users unlimited usage packages that limit a user's exposure to running up charges. However, for parents and employers interested in preventing a user from sending 300, or even more, text messages per day with their phone, or running up a huge bill for services that are not included in the "unlimited usage package," such as downloaded games or ringtones, surfing the Internet, etc., unlimited usage offerings are not a complete solution. Another partial solution is to provide the administrator (e.g., parent, employer) with an alert when a user has reached some limit for a service. For example, a parent could be alerted when a child has spent more than $10 on text messages within a certain period of time. An alert, however, does not actually limit usage of the service, it just warns the parent/employer that the limit has been reached, at which point the parent/employer has to intervene to prevent further abuse, such as by taking the phone away from the user, which is one of the problems with postpaid services in the first place.

Some prepaid phones may have the ability to store electronic units, such as through use of a credit card charge or electronic transfer from a bank account. Some corporate customers with multiple users under the same service provider may be able to have a single account for their business, with subaccounts assigned to certain phones and charged to the particular departments within the corporation to which the employees using those phones correspond. Some service providers may also be able to provide affinity accounts, which include special rates and promotions for groups of people belonging to a similar business, club, etc. In each case, however, these accounts operate separately from one another in that all of the charges for a particular phone are charged to a particular account, rather than some charges being billed to one account while other charges are billed to another account. The same is true with respect to discounts and promotions, i.e., a discount or promotion is either applied to an existing account or it is not.

SUMMARY

A master account system for managing one or more electronic devices through the establishment and enforcement of policies associated with the devices. Enforcement policies may be determined by characteristics of space, time and/or other criteria (e.g., eligibility rules pertaining to a government-established program) relating to the user; the administrator(s); a set or sets of user(s) and/or administrator(s) in relation to one another; or some other general circumstance. The master account may be established on a pre-paid or postpaid basis with limits applied in real-time or near-real-time. The policies may apply across any number of devices associated with the master account. The addition and decrement of units of measure associated with the master account and device account(s) may be limited to the master account, to the master account and one or more device accounts at the same time, or allocated in numerous other ways. Content and other activity filtering may also be established and managed at the master account and/or device account level.

BRIEF DESCRIPTION OF THE DRAWING

FIG. 3 illustrates a contact management interface accessible via a website in accordance with an embodiment.

FIG. 4A illustrates a feature management interface accessible via a website in accordance with an embodiment.

FIG. 4B illustrates a webpage enabling various forms of content filtering in accordance with an embodiment.

FIG. 5 illustrates an edit setting screen for feeds based on the feature management of FIG. 4A.

FIG. 6 illustrates the wallet refill and auto-refill features accessible via a website in accordance with an embodiment.

FIG. 7 illustrates a wallet gift refill feature accessible via a website in accordance with an embodiment.

FIG. 12 illustrates a master account summary screen showing master account level service balances, usage summaries and payment activity.

FIG. 14 illustrates a device management screen.

DETAILED DESCRIPTION ILLUSTRATIVE EMBODIMENTS

Figure 1:
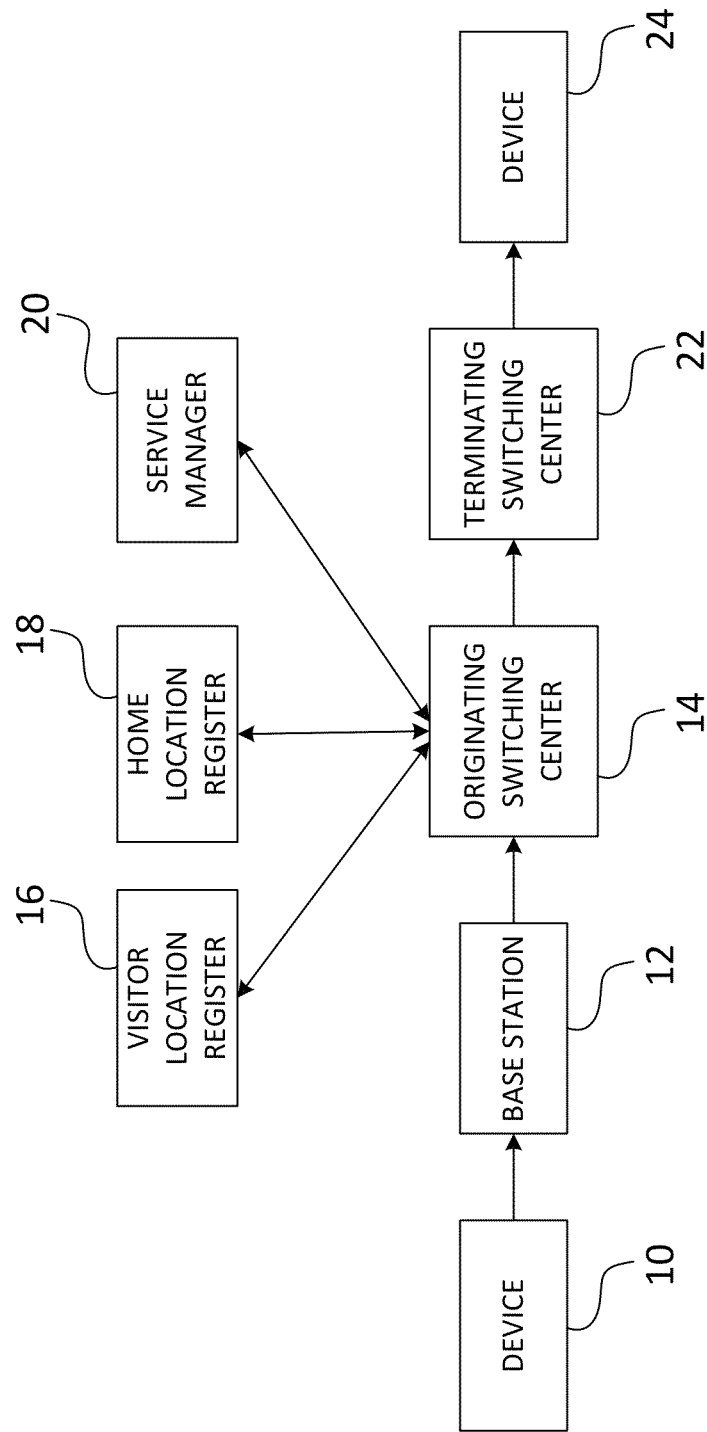
FIG. 1 is a flow chart illustrating, at a high-level, the process of initiating and permitting a service to be initiated.

The present invention is directed to the management of a device in general, and more particularly to the management of a device by an administrator or administrators, such as a parent, guardian, financier, employer, supervisor, or responsible party, who can specifically control the use of a device, through management of its features and the accounts associated with the device through a master account. In the context of the present invention, a master account and a device account (collectively "accounts") are forms of electronic accounts that have certain added features that regular electronic accounts do not have and which can be used in additional ways that electronic accounts are not used. An account can also be a singular item that includes a number of control features or a collection of items, each having their own control features, which operate in conjunction or cooperate with one another to achieve the same purpose as a singular item.

An account would typically include configuration settings for different services available to a user assigned to the account, would include a user's profile information, and would provide the user with the ability to manage the features that are activated for the account. Feature management can be implemented with or without accounts or wallets (as sometimes referenced herein), but is illustrated herein with wallets to provide a more thorough explanation of how feature management works. Some of the features of a wallet that are added to an account include how money is entered into the wallet, the nature of the source of the money entered into the wallet, information or data derived from the prior use of the users wallet or the wallets of all users in aggregate, who holds or has access to the wallet, the rules that apply to how each wallet can be used for different services, and the hierarchical use of the wallets for each service. A configuration example involves an administrator (parent) wanting an employee/child to have an amount in his/her wallet during a particular month(s) based on the mean (average) amount consumed per month (for a feature or set of features, or for a type or types of content, or in aggregate) by all users under that person's administration in the prior Y months. This type of configuration results in the user getting "what everyone else gets (on average)" and may help to reduce fairness complaints. In other words, usage limits for a feature or features or overall can be set by the administrator(s) by using statistical information derived from prior usage by the user and/or other users, which statistics could include historical usage and/or forecasted usage needs.

Managing features (which includes functions, content, etc.) associated with a device empowers the administrator to control how the device is used and goods, services and activities are accounted for or paid. For example, a common problem with providing a child a cell phone is that they have free reign over downloading ringtones and games, accessing websites, downloading content, etc. Through feature management, rules can be established for managing content, access and other actions associated with a device, including: (1) turning off or limiting the download capability, URL access, and other activities, entirely; (2) limiting how many ringtones and/or games can be purchased in a given time frame; (3) turning off other functions of the device; (4) customizing features associated with a function of the device; (5) sending alerts when a certain dollar or unit threshold has been reached over a given time frame; (6) choosing which types of content may be downloaded or accessed by the device based upon content rating or other parameters; (7) choosing to have the administrator pay for specific types of content, like educational applications or work productivity applications; (8) choosing to have a third party pay for specific types of contents or applications; (9) using a pre-defined or dynamically-created filter on such things as downloadable content or surfable Web sites (i.e. set to only allow games to be purchased with an "E" rating); (10) choosing the time frame (time of day, days of week, etc.) when downloads can occur; or (11) setting feature consumption rules based upon the statistical usage of that user, a set of users, or all users.

It is noted that while embodiments described herein are described in terms of a phone or mobile device, the teachings of embodiments herein can be applied to other devices, including a gaming device; a media player; a desktop computer; a laptop computer; a smart phone; a tablet, netbook or notebook computer; a photocopier; a scanner; a printer, a data card; and other devices connected to a network through wireless or wired network connections. The teachings are also not limited to a physical device. Instead, teachings described herein are also applicable to local and remote services, applications, and websites.

Wallets also differ from accounts in that multiple wallets can be tied to a single device, such as a phone, a single wallet can be tied to multiple devices, and wallets can be completely dynamic, i.e., the wallet is not tied to any one device. For example, a dynamic wallet could be a "picture messaging" wallet, where that wallet is only used for photo services, which may be funded by the administrator, the user of the phone, or an outside party (i.e. friends or family). That dynamic wallet could apply to a single user's wallet, or across multiple wallets in a given account (e.g., across children in a family or employees in a company).

Charges to wallets or accounts can be done on a pre-paid or postpaid basis. Additional wallets or accounts can also be used as back up payment sources for a single wallet or account associated with a device or multiple devices. These additional wallets/accounts can be set up to automatically cover the cost of specific services for the device(s) or as back-up for the user wallets/accounts in the event it runs low on units. If the user of a prepaid phone is a child that needs to call their mother, but the child's wallet is low on units, the mother's wallet could be used to cover the cost of the call from the child to her. For even greater security, the mother's wallet could be backed by a credit card that automatically adds units to the wallet when needed so there could be no possibility of the mother's wallet running out of money. Alternatively, an alert could be sent whenever a wallet associated with a master account is low on units or below a level specified by the user of the master account. That user could respond to the alert to enable the units to be added to the device account. For instance, the parent could respond to the alert message received with a "YES" or "NO" response, with "YES" indicating that units can be added from either the mother's wallet or from the credit card to the child's wallet. More details on alerts is provided below.

It should be noted that although the term "units" is used herein to refer to the value stored in or charged to a wallet/account, a wallet/account could also be used to store and spend almost any type of unit of measurement, whether money, credits, points, time, or some other indicator that can be measured in some way or manner. For example, in a system in which wallets/accounts utilize points, the points could be a surrogate for other units of measure, such as money. Instead of having a monthly fee tied to a specific device, a master account could be established and assigned a certain number of points. Any time an individual device linked to that mast account might have otherwise incurred a base monthly fee (such as a fee associated with a monthly renewal date, a fee associated with a new activation of a device, or a fee associated with a device coming off of a suspended status) one or more points could be decremented from the master account. Other points could be decremented for other activities, such as data usage, minute usage, download usage, or any of a number of other activities. For example, rather than add units to a device account or multiple device accounts associated with a master account, units could only be added to the master account and decremented from the master account based on the activities and services associated with the device accounts. This embodiment is further described with reference to FIG. 12 below.

Returning to the example above, the account(s) assigned to the child's phone could also be arranged so that calls with family members were always covered by the master account, but calls with the child's friends were always covered by the child's account. Other "goods" (where "goods" include both hard goods in the real world (e.g., one's lunch) and digital goods (e.g., a software application or digital magazine)) and services, in addition to calls, such as downloads of applications, games, wallpaper, ring tones, etc., or the sending and receiving of SMS text messages, could be allocated between the different accounts as well, with some services being paid by the parent, some services being paid by the child, or any other arrangement they prefer. In the context of goods, the different accounts could be utilized as a type of electronic payments system, debit card, etc., but subject to the same type of policy management as the services. For example, a child may be allowed to use the child's account to buy lunch at school, or educational books from a company such as Scholastic®, but not to buy ringtones or non-education/entertainment books from the same vendor.

Requiring a child to pay for certain goods and services can be a very effective way to help teach that child the difference between "want" versus "need," which tends to be much clearer to children when they are forced to buy something they "want," but do not "need," with their own money.

Of course, the organization and structure of master and device accounts is not limited to just phones or devices for children. Such accounts are effective tools for any device used by someone requiring some level of supervision, such as a handicapped individual, a person suffering from dementia, a corporate employee, or even an adult that has shown poor judgment in the past and requires help managing their affairs. Additionally, accounts could support a wide and various range of devices including communications, computing or game devices and a range of users and administrators and wallet-funders including corporate sponsors, government agencies, schools, healthcare providers and employers. For example, a phone associated with a device and a master account may be provided to an employee, such as a child care provider, that enables the child care provider to only call or receive calls from a parent of the child being watched, and emergency services, but no one else. Alternatively, the phone could be set up without restrictions, but with multiple device accounts that allocated out the expense of calls to the appropriate parties. For example, calls to and from parents could be managed so as to be paid by the parent's master account, along with emergency calls and other such things, whereas all other calls, such as personal calls made by the child care provider, could be managed so as to be paid for out of the child care provider's device account. Therefore, a parent or administrator can set up a plurality of rules indicating a first set of conditions or events which are covered by a first account, a second set of conditions or events which are covered by a second account, etc.

With respect to any device for which one or more accounts are established, there would be an administrator, such as a parent, employer, guardian, governmental entity, etc. The administrator would be responsible for establishing the rules or parameters under which the device and device account(s) could be used. If so desired, the administrator could establish a master account that was tied to the same device or multiple devices and establish additional rules or parameters under which the master account could be used in place of or in conjunction with the device account. As the administrator for one or more device accounts, the administrator could also move units between different accounts. This would enable a family or company or governmental entity to manage their device service (including voice, SMS, data, etc.) and to budget in a manner that was not possible with a traditional bulk "shared plan," i.e., a 1000 minute/month voice bundle, where every user assigned to the plan had an equal ability to use the plan. Further variations of how units can be allocated between and used by master accounts and device accounts are explained below with reference to FIGS. 12-14.

Before explaining feature management and accounts in greater detail, the manner in which accounts can be utilized in a telecommunications network will first be described. Although accounts could be implemented in any type of situation, a mobile telecommunications network is referenced in FIG. 1 as a particularly environment for the implementation of accounts. It is to be understood that alternative embodiments using a different environment are also possible without departing from the spirit of embodiments described herein. Thus, accounts may be associated with any type of device that is subject to use by someone other than the administrator and that can be in communication with an appropriate control network. This type of device is referenced herein as a communication device, not because the device is used for communication, but because it is capable of being in communication with the control network. Hence, the "device", as defined herein, could be a PDA, a photocopier, a game, a computer, a network device, a tablet, a data card, a magnetic strip card, a software application, a website, a bicycle, an automobile, a medical device, a machine, a vending machine, a truck or other similar mobile vehicle, or any type of device or object or system that one could imagine that is capable of being remotely controlled by logical rules. Also, the types of items that could be acquired or used by the device or ways in which the device can be controlled are only limited by the nature of the device. While a cellular phone or smart phone is usually used to make phone calls, it can also be used for many other functions, including send and receive text messages, download and play games, music, movies, etc., and even make purchases of other objects or services that have nothing to do with the device, such as a gift at a shop, or a drink from a soda machine.

In an embodiment, one account can be used to pay for one type of service or application, and a second account can be used to pay for a second type of service or application, or a single transaction may be simultaneously debited from two different accounts. In institutions, organizations and companies, it is often necessary to assign expenses to different accounts, as the different expenses may originate from different sources. It is often also necessary to track and monitor the different expenses within an institution, an organization or a company. The combination of the policy enforcer and the accounts enables services from one device, such as a photocopier, to be controlled via policies and rules created by the administrator, and for charges associated with the photocopier to be associated with a given account. A high level of granularity is also possible. In the photocopier example, black and white copies can be charged to a first account, while color copies can be charged to a second account.

The idea of simultaneously debiting two different accounts enables other possibilities. For example when a megabyte of data or a minute of time has been used by a device, both the device account and the master account can be debited at the same time for the usage, or if either account has hit a limit, the transaction can be denied prior to completion (real-time management), or future transactions could be prohibited once a limit on either account had been reached (near-real-time management). This allows a master account to control a device account not only through limitations on the number of units or resources allocated to the device account, but also based on overall limits or resources allocated to the master account. For example, a master account for a family could have an overall limit of 5 gigabytes of data. There may be five device accounts associated with the master account, where three of the devices have data limits of 0.5 gigabytes and two of the devices have data limits of 2.0 gigabytes each, equally a total of 5.5 gigabytes. Under such a scenario, if one 2.0 gigabyte user had reached their data limit, the master account could deny that device access to further data until the accounts were reset, such as at the end of a month or when a pre-paid account was recharged. The fact that the total data allocated to the device accounts does not equal the total data allocated to the master account does not matter because the master account data limit could be reached without a single device account data limit being reached, such as when two device accounts are at 1.99 gigabytes, two device accounts are at 0.49 gigabytes, and the fifth device account attempts to use more than 0.04 gigabytes of data. In such as case, the master account data limit would be reached so the fifth device account would be denied the additional bandwidth even though that device account had barely used any data against its data limit. Other forms of limitations are discussed with reference to FIG. 14 below.

Figure 8:
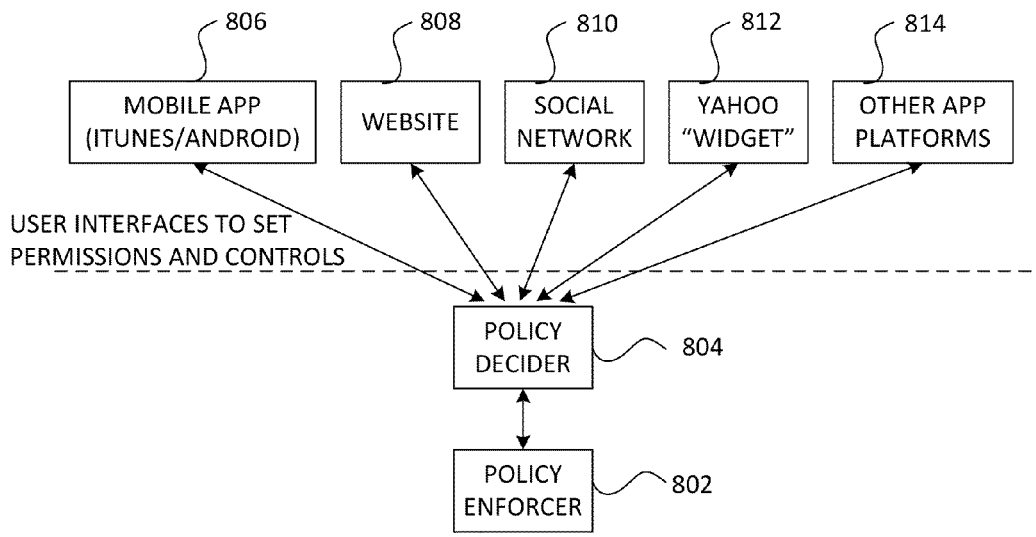
FIG. 8 is a block diagram illustrating the relationship between the policy enforcer and the policy decider, and between the policy decider and a plurality of user interface layers.
Figure 9:
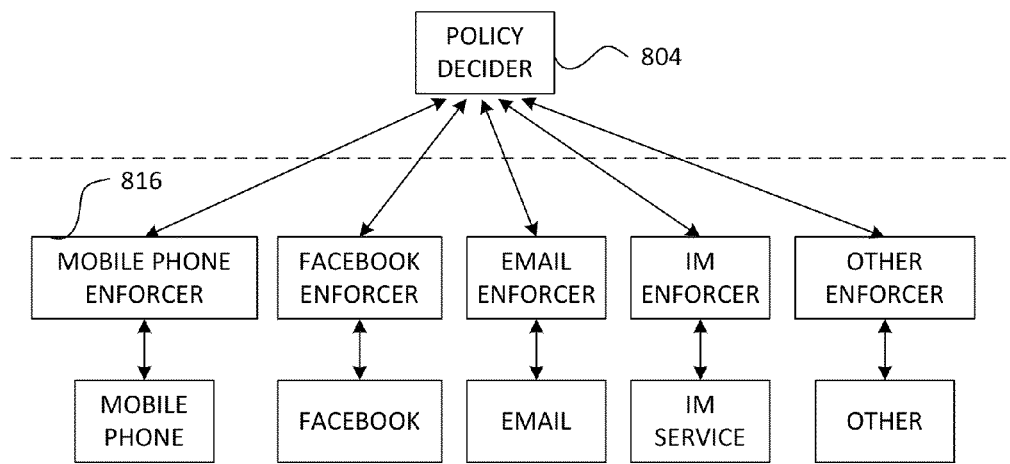
FIG. 9 is a block diagram illustrating in greater detail the relationship between the policy decider and a plurality of policy enforcers customized to a particular device, service, or application.

FIG. 1 illustrates an embodiment of a device 10, as described above, being utilized to originate a service, such as a call or message, using common standardized methods, e.g., with respect to phones, as defined in IS-136 (a TDMA standard), in IS-95 (a CDMA standard), etc. While this embodiment is particularly relevant to a wireless telecommunication device operating within a wireless voice network environment, it is just an example, and the invention is not limited to this embodiment. Client-server environments could take the place of the wireless voice network, the policy decider(s) and policy enforcer(s) could be implemented in different forms and different types of networks and devices that take the place of wireless telecommunication networks and devices, goods or services having nothing to do with voice communication or mobile device applications could take the place of voice services, etc. Likewise, the policy decider(s) and policy enforcer(s), such as illustrated in FIGS. 8 and 9, could be embodied in the electrical circuitry, firmware or other logic of a single integrated circuit or a set of integrated circuits (a chip set) embedded in any type of device.

As illustrated in FIG. 1, the device 10 would first establish a connection with a base station 12, which would in turn connect to an originating switching center 14. Upon receiving the origination request for a service from the base station 12, the switch 14 would attempt to authenticate the device 10 by querying a visitor location register 16 and a home location register 18 to determine if the device 10 is registered with the telecommunications network and authorized for use on that network, collectively referred to as "validation."

Upon successful validation, the switch 14 would trigger the service manager 20, based on standardized methods, e.g., as defined in IS-41, IS-771, IS-826, etc. The service manager 20 would first authenticate the subscriber of the device 10 based on their mobile directory number (MDN) and/or their mobile subscriber identification (MSID), or some other type of identifier, as a valid subscriber. The term "subscriber" is used to generically define the person or entity that subscribed the phone to the telecommunications network, whether that happens to be the user or an administrator. If the subscriber is not valid, the subscriber will be notified through the device 10 and the session will be terminated. If the subscriber is valid, the service manager 20 will then enforce the provisioned voice, SMS, data policies, fiduciary limits, and/or rules for the particular user of the device 10, which includes, but is not limited to, account balance, account state/status, provisioned services, other functions or functional restrictions (such as contact restrictions, time-of-day restrictions or allowed number list functions/blocked number list restrictions), user selected service controls, etc. If the user fails any of the provisioned policies, the user may or may not be notified and the session will be terminated. The provisioned policies are established by one or more global rules and/or one or more local rules, as further described below. Operation of the service manager with respect to data service feature management (data policy) establishment and enforcement is further illustrated in FIG. 2.

If the session is allowed to progress, the service manager 20 will then rate and charge the service transactions requested during that session. To do this, the service manager 20 again looks to the global level rules and the user level rules that have been established for the device in question. In addition to including or establishing the provisioned policies, the rules establish an order of precedence as to how the device/phone is to be administered and how authorized service transactions are going to be charged. The global rules are checked first. If a service transaction requested can be categorized according to one of the global rules, the service transaction will be rated and charged according to the global rules. For example, the phone service provider could establish that any call to its customer support phone numbers will be allowed and should always be free to its users, in which case the user level rules would not apply.

As previously noted, embodiments are not limited to rating and charging service transactions as they are requested or per session in real-time. In a particular embodiment, service and application transactions are charged near-real-time, or even on a post-paid basis, such as per billing cycle, or at a specific period of time. Assuming that a customer gets a monthly bill, and during the month makes various phone calls and sends/receives various text messages, at the end of the month the carrier processes the monthly bill. It is at this point that the various services used by the customer are charged to one or more accounts. The phone calls made by the customer may be charged to a first account, while the text (SMS) messages may be charged to a second account. Similarly, if a customer was using a phone for personal calls and for work-related calls, at the end of the billing cycle personal calls can be charged to a personal account, while work-related calls can be charged to a business account. Different bills can also be generated for different account. For instance, a first bill can be generated for charges associated with the personal account and sent to the customer, while a second bill can be generated for charges associated with the business account and sent to the corresponding company.

The user level rules define how a user is to be rated and charged once it is determined that the global level rules do not apply to the service transaction request and/or payment. Additional rules can also be established that work in between the global rules and the user rules, such as promotional wallet rules and dynamic wallet rules. These additional rules can be integrated as follows: for each device, the service manager 20 has a variety of device accounts allocated to support multiple services and functions, such as a device account, a master account, and other accounts. If the service transaction request has been authorized by the global rules, the service manager 20 would then check to see if the service transaction could be charged to another account.

For example, a demonstration account could be established to allow a device to be used (or used for a specific function or purpose) for a short period of time and/or in a specific location. While some accounts may contain financial credits (e.g., money) as units, other accounts, such as demonstration accounts, may only contain points or other units that have no financial value per se. If the demonstration account applies and there is a sufficient balance of units in the account, then the account would be decremented so as to reduce that balance. If the service transaction is not a demonstration activity, the service manager 20 will apply other user level rules and either charge the device account or the master account.

Whether a charge for a service transaction of a device is taken from the device account, the master account, or some other account, depends on the device level (local) rules established by the administrator for that device. Hence, the administrator has the ability to specify unique service transactions as being charged to a master account versus the device account through use of unique identifiers for each service transaction (e.g., MDNs to be charged to the master account for voice/SMS/MMS, content identifiers to be charged to the master account, IM screen names to be charged to the device account, etc.). In the context of a pre-paid phone, an account would typically include a balance that corresponds to some amount of United States Dollars deposited with the service provider. In other contexts, as noted above and below, an account could be designed to hold any unit of measure in place of dollars, including other currency types, service units, assets, or even something completely made up that only has value in some limited context, like points or virtual money in a multiplayer, on-line, role playing game.

Once the service transaction has been rated and charged, the service transaction is permitted to continue. If the service transaction is a call, a download, a text message or any other service that requires the device 10 to be connected to another device connected to a base station, a connection would be established to the terminating switching center 22 and then connected to the device 24, assuming device 24 is available and the service transaction can be completed.

Figure 2:
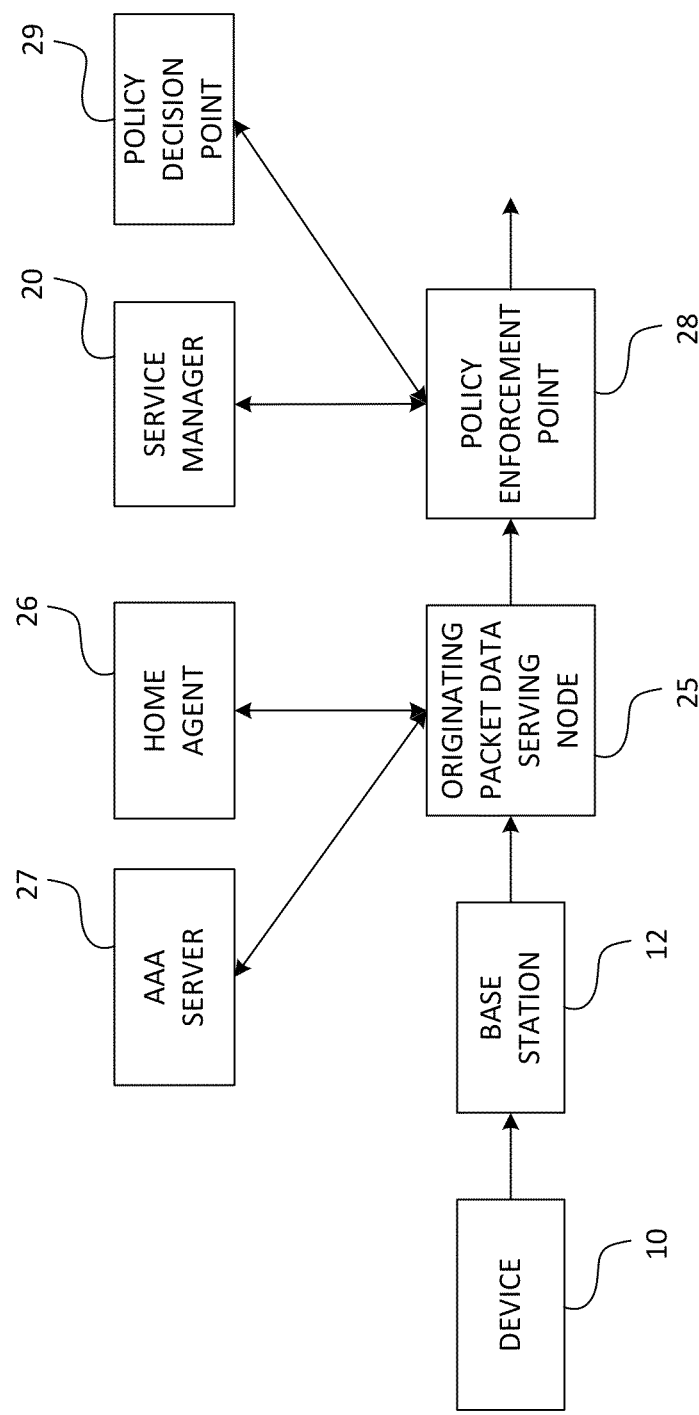
FIG. 2 is a flow chart illustrating the process of initiating a data session for a mobile device, checking the data policies associated with that device, and enforcing those data policies.

FIG. 2 provides a description of how a mobile communication device is utilized to originate a data session and how data service feature management operates. As in FIG. 1, the device 10 originates a session (data in this case, but could also be voice as shown in FIG. 1) by establishing a connection with base station 12, which in turn connects to an originating packet data serving node (O-PDSN) 25. The O-PDSN 25 acts as a gateway by providing access to the Internet, intranets and applications servers for the device 10 and acts as a client for the home agent 26 and the authentication, authorization and accounting (AAA) Server 27. Upon receipt of an origination request for a service from the base station 12, the O-PDSN 25 will attempt to validate the request. Validation involves first attempting to authenticate the device 10 by querying the AAA Server 27 and the home agent 26 to determine if the device 10 is authorized to perform the requested action within the carrier network. If the device 10 has been validated, the O-PDSN 25 will obtain an IP address for the data session and route the device 10 to the appropriate policy enforcement point (PEP) 28.

The PEP 28 is a logical element that can be physically housed in another packet data serving node, a gateway device, a chip set, etc., depending on the service request, such as a wireless application protocol (WAP) gateway, instant messaging gateway, email gateway, multimedia messaging service gateway, or other form of gate, etc. The PEP 28 is responsible for enforcing a decision by the service manager 20 and policy decision point 29 to accept or reject the service request.

The PEP 28 operates in conjunction with the policy decision point (PDP) 29, and depending on the configuration of the network possibly the service manager 20, to authenticate the subscriber of the device 10 as a valid subscriber, based on their MDN and MSID, or some other type of identifier. The PDP 29 is also a logical element that can be physically housed in the service manager 20, a chip set or in another server accessible to either the service manager 20 or the PEP 28. The PDP maintains or stores a list of policies that have been established to control the features and functions of the device 10 and decides, based on those policies, to either accept or reject the service request.

Such requests might be initiated by the device 10, such as when the user of the device sends a request to download some type of content, such as a game, a ringtone, a website, a picture message, a text message, etc. In other cases, the request might be initiated by another device seeking to communicate with the device 10. For example, the user of device 10 might have a text message sent to her/him by a friend, but if a policy is in place that prevents the user from receiving text messages at the time the message is sent, then the request to communicate with the user will be denied. Likewise, the user's request may not have anything to do with making a call or downloading content, but rather just to use some feature or function of the device, such as a game that is already stored on the device. Even in this instance, the device would need to communicate with the PDP to determine if a policy is in place that would prevent use of the feature or function for some reason, such as the wrong time of the day, the wrong day of the week, the game has been played in excess of some time limit set on the game, etc.

In situations where the subscriber is not valid, PEP 28 may notify the subscriber through the device 10 and take one of a number of different possible actions, such as terminating the session or transaction associated with the service request, redirecting or rewriting the session or transaction, degrading the session or transaction to a lower quality or class of service, etc. If the subscriber is valid, PEP 28 will enforce the provisioned policies for the particular subscriber of the device 10. As noted above, these policies may cover many different rules that apply to the features or functions of the device based on requests sent to or received from the device. These policies, include those items noted above, but also include many other things, such as account balances, account state/status, provisioned services/features, user selected service controls, and other functions or functional restrictions, such as URL restrictions, content type restrictions, time-of-day restrictions, quality/class of service restrictions, etc.

If any of the provisioned policies fail (e.g., a restriction or limit is met), the subscriber may or may not be notified and the PEP 28 will take one of a number of different possible actions, such as terminating the session or transaction, redirecting or rewriting the session or transactions, degrading the session or transaction to a lower quality or class of service, etc. When the requester is not the subscriber, it may be preferable to notify the requester or notify both the requester and the subscriber. For example, if someone attempted to call the user, or send an email, Instant message, or text message to the user, and there was a policy in place that prevented the call or communication, then it might be necessary to tell that someone so they know why they cannot contact the user at that time. It may also be necessary to notify the subscriber or an administrator so they know what happened as well. If all of the policies pass, then the session or transaction associated with the service request is permitted to continue.

Accounts may be set up and administered in a number of different ways. For example, in the pre-paid cell phone context, the administrator and user could sit down together at a computer connected to a website associated with the service provider of the phone and view and/or edit account settings for that user's phone. The administrator may also call the service provider and administer the device and master account over the phone. While the device account is generally going to be associated with the device being used, which itself will have some form of unique identifier, the master account will not necessarily be tied to just the one device. Hence, the master account just needs to have a unique identifier that may be used to associate the master account with each of the devices it will be managing.

An example of a system for managing a number of user accounts from within a single master account is illustrated in FIG. 3. The Contact Manager 30 generally illustrated in FIG. 3 is in the form of a webpage on a website that enables an administrator to manage one or more device accounts associated with master account. The Contact Manager 30 may also be used by the users to manage the device accounts in a similar fashion. Since the Contact Manager 30 illustrated in FIG. 3 is a webpage, underlined text indicates hypertext or hyperlinks that may be selected with a pointing device to go to other webpages or even other websites.

As shown in FIG. 3, Daniel is the administrator, as indicated in area 32 and has administrative rights over three shown users/device users, Eleanor, Ryan and Steve, and an unspecified number of additional users. The account summaries for Eleanor, Ryan, and Steve are shown in the Account Overview area 34. The additional accounts would be visible if the "See all accounts" option, located below area 34, was chosen.

Daniel is shown to have a balance of $70.53 USD in his master account shown in area 32. Eleanor's name, phone number, and a balance of $0 USD in her account, are shown in the upper part of Account Overview area 34. Likewise, Ryan's and Steve's names, phone numbers, and account balances are also shown in area 34. Both Ryan and Steve have positive cash balances in their accounts. Because Eleanor has a zero balance, she also has a low balance alert shown below her account summary to alert Daniel. Alerts may be established independent of any limits as well. For example, an alert may be sent as a limit on a device account or master account is approached instead of just when the limit has already been reached. In this case, as Eleanor already has a zero balance, an alert has been sent to Daniel and Eleanor cannot initiate a service unless Daniel has indicated that he would be willing to pay for the service from the master account or has authorized some other account managed by the master account to apply to any service transaction desired by Eleanor.

Based on this alert, Daniel is presented with the options of informing Eleanor to add money to her account or adding money to Eleanor's account on his own. Although many different methods of refilling an account could be provided, the two options shown are to refill Eleanor's account now or to set up an automatic refill for Eleanor's account. The refill and auto-refill options are further discussed with respect to FIGS. 6 and 7 below. The low balance alerts could also be set at different levels other than zero. The administrator or the user could set the low balance level for an account at $5 USD or $10 USD, or set multiple low balance alerts that are each treated the same or in different ways. For example, a first alert could be sent only to the user, such as through an email, a text message, or in some other manner, while a second lower balance level alert was sent only to the administrator. The administrator therefore has the ability to customize the activities or events that trigger the sending of alerts, to select the recipients associated with each alert, and the content to include with each alert.

The Contact Manager 30, which may be part of the master account, may serve a number of purposes, including: (1) to enable the administrator to manage all of the account associated with the master account; (2) to establish certain general rules that control device functions and payment; and (3) to establish certain local rules that control device function and payment. As shown in FIG. 3, Daniel has chosen to manage Steve's account. The arrow 35 next to Steve's name would activate a drop down menu that would enable Daniel to select a different device accounts to manage, such as Eleanor's account or Ryan's account. Since Steve's account has been selected, Steve's Contacts are illustrated in the local rules area 36. The global rules associated with Steve's account are illustrated in the global rules area 38.

The Contact Manager 30 may also be configured to enable Daniel to manage many additional or different services or functions (downloads, etc.) for Steve in the same manner as calls and text messages are illustrated in areas 36 and 38. For example, the Contact Manager 20 may be used to list the names and numbers of people that Steve can or cannot communicate with by calls or text, referred to herein as allowed number lists/blocked number lists. As used herein, the term "blocked number list" refers to a list of phone numbers that have been blocked, both in terms of sending calls/texts to Steve's phone and receiving calls/texts from Steve's phone. The term "allowed number list" refers to a list of phone numbers that have been permitted, both in terms of sending calls/texts to Steve's phone and receiving calls/texts from Steve's phone.

The Contact Manager 30 may also be configured to enable Daniel to select and manage the features or functions of Steve's phone that Steve could use, such as the ability to use the device account to pay for physical goods at a store using the phone, (i.e., a feature management function), or the time of day during which the phone could be used in general or for specific purposes (e.g., okay to call Jeff, but only between 3 pm and 6 pm), i.e., a time management function. A separate page may also be provided, as illustrated in FIGS. 4A and 4B, that combines various restrictions on specific features, such as choosing for Steve when that feature can be used, how much it can be used (if at all), and who is going to pay for the feature or function, as shown by FIG. 4A, or other forms of filtering/control, as shown by FIG. 4B.

Although many different functions associated with Steve's phone may be managed through Daniel's master account, in order to more clearly illustrate how the Contact Manager 30 may be used to manage Steve's wallet, FIG. 3 only illustrates one function, the contact management function. The additional functions, such as feature management and time management would be similarly structured and may be part of the Contact Manager 30, or parts of separate management functions on other web pages, as illustrated in FIGS. 4A and 4B. In addition to managing a specific function within a function manager, it is also possible to override functional controls within one function manager from within another function manager. This point is further described below with respect to the "Override Restrictions" feature 40 of the Contact Manager 30.

The local rules established for Steve in local rules area 36 may include the contact and payment rules associated with three specific people and their phone numbers and the general category of "All Other Numbers." For each contact, Daniel may decide to either allow calls/texts to the contact, or to block such calls/texts, by clicking on the circular radio buttons illustrated in area 36. When a radio button has been selected or clicked, the central area of the radio button is darkened. When the radio button has not been selected, the central area is clear. Daniel can also specify whose wallet will be used to pay for any such calls/texts.

As illustrated, calls/texts to Jack are allowed and are to be paid for out of the master account. Since Daniel is the administrator of Steve, Daniel's master account is referred to as the "Master Accnt," where account has been shortened to "Accnt" for space saving purposes. Different language, other than "Master Accnt," may obviously be used in different contexts. For example, if Daniel was Steve's parent, Daniel's master account could be referred to as a parent account. If Daniel was an employer and Steve an employee, Daniel's master account could have a different name, etc. Since Daniel has indicated he would pay for any calls/texts to or from Jack and Steve, even if Steve had no money is his device account, Jack and Steve would still be allowed to communicate and the charges would be charged to Daniel's master account.

While calls/texts with Jeff are also permitted, they are to be paid for by Steve out of his device account, since Steve's account has been selected. If Steve runs out of money in his account, however, he would no longer be able to communicate with Jeff until Steve refilled his account because neither the master account nor Grandma's account has also been selected. It should be noted therefore that the account are not mutually exclusive. Hence, with respect to Jeff, both Steve and Grandma's account could be selected at the same time, or even all three accounts (Admin, Steve and Grandma) could be simultaneously selected. In such a case, additional local rules would be used to establish an order of precedence between each of the accounts. For example, calls with Jeff would first be paid for by Steve, but when Steve ran out of money, Grandma would cover the cost of such calls, either for a limited amount of money, for a limited amount of time, or until Grandma ran out of money as well, in which case the master account would be charged. Many other orders of precedence could obviously be established.

With respect to Jane, any call or texts are permitted and will be paid for out of Grandma's account. In this case, Grandma's account is a dynamic account that is associated with Steve's account and Steve's device, but is not controlled by Grandma. Grandma has set up an account, put units in it and indicated to Daniel that her account can be used by Steve for the specific purpose of calling Jane. Grandma's account could also be associated with any of a number of different administrators, and different users, for different purposes and functions with respect to each user. In this case, Grandma's account only has a unique identifier that enables it to be associated with other accounts as she so directs, but is not associated with any particular device, per se. Grandma's account could also just be associated with Steve's account or even the master account without any specific function associated with it. Thus, Steve and the Admin could use the units in Grandma's account, as determined by the Admin, for any purpose they might choose.

Also shown in FIG. 3 is the name of "All Other Numbers." Because the "No" choice was selected for "All Other Numbers," no calls/texts to or from any numbers other than those shown in the local rules area 36 are permitted by the local rules. Since no communication is permitted with numbers other than Jack, Jeff and Jane, there is no need to designate whose account would be charged for such communication. FIG. 3 further illustrates an "Override Restrictions" function 40, which serves as a local rule that can be used to override any restrictions on functions applicable to Steve, such as a time of day restriction. An override restriction could be set up to be very narrow or very broad. As illustrated in FIG. 3, the override restriction is unspecified, so it may apply to only a narrow set of functional restrictions established by other local rules on web pages not shown herein, or to any other functional restrictions that may have been established.

It is further noted that on devices provided by an educational institution or by some other third party, such as devices provided to mail carriers by the U.S. Postal Service, the educational institution or the third party may specify the degree of control available to be exercised by the administrator, including whether the administrator may override rules specified by the education institution or the third party. For example, an educational institution may choose to not create policies associated with the issued devices, leaving the responsibility to create the policies to the parents. Alternatively, the educational institution may create a set of policies which are global to all of the students, and which cannot be overridden by the parents, only allowing the parents to make additional rules or only allowing the parents to make minor changes to the policies created by the educational institution. Even if the educational institution specifies a global set of policies for all of the students, in a particular embodiment an exception rule can be provided that allows the devices issued to one or more students to be controlled by the parents. Similarly, an administrator or an employer who issues devices to a group of users or employees, may configure the degree of control that each user has over the device issued to him or her. In the Postal Service example, devices for mail carriers may be subject to rules of the local Postmaster, and then, above that, other general rules of the regional Postmaster, and so forth up the organization line.

As illustrated in FIG. 3, only Daniel is permitted to manage Steve's phone, but Steve's phone may also be set up to be managed by Steve's school as well, i.e., a second master for some purposes. For example, Daniel may register with a mobile phone service through the school that permits Steve to have his phone with him at school, rather than in a locker, but which tightly controls how the phone may be used during school hours and/or on school property (i.e., in specific locations). For example, only certain functions or features could be enabled during school hours and/or on school property so the phone may not be used to cheat, or to play games, or to call other students, but the phone may be used to call a parent or certain other people that were permitted to be called. If Steve's phone had some form of location feature associated with it, i.e., a feature that enabled the phone's location to be determined, even though a rough estimate, the school control function may be set to only be operational when Steve's phone was on or near school property. In this manner, if Steve had to walk home, or was on a field trip, the phone may still work as permitted by Daniel, even if the school had other limiting control on Steve's phone at that time. Additionally, the school may decide to restrict functions or features by specific groups, such as by grade or by people participating in specific activities.

Management of the phone may also be based on other factors aside from location or time, such as using inputs from the device or other sources regarding movement, such an accelerometer in the device or a third party service that is capable of determining when a device is in motion and can communicate that movement to the policy decider. Hence, if the device was moving above some threshold speed or other criteria, or it is determined that the user is using any kind of vehicle (e.g., car, skateboard, bicycle, etc.), such that use of the device might be unsafe, the device's usage could be restricted in some manner by the policy enforcer. Other factors that may impact that management of a device may involve a device's user's eligibility for government programs, e.g., subsidized school meals.

Area 42 includes additional functions that may enable changes to area 36 and 38 to be saved, or for new contacts to be added.

Obviously, the local rules may be much more extensive than as illustrated in the local rules area 36 of FIG. 3, which is also true with respect to the global rules shown in global rules area 38. As illustrated in FIG. 3, only three global rules are illustrated: (1) 911 calls are allowed and are always free; (2) Customer Care Calls are always allowed and are free; and (3) 900-number Calls are not allowed. Since these are global rules, even though the local rules do not allow calls and texts to or from numbers other than those contacts listed in Steve's contact, calls to 911 and to Customer Care Calls may be permitted despite the local rules. In the same context, even if the local rules permitted calls to other numbers, by selecting a global rule blocking 900-number calls, the global rule applies first and the local rules are not considered.

Although the master account may typically be arranged to cover zero balances in device accounts the master account manages, this arrangement may be reversed under certain circumstances. For example, if a service was designated as being paid from the mast account, but the master account had a zero balance, rather than block the service, the payment could be set to revert back to being paid by the device account, or another account (Grandma's account) as described above. This type of arrangement ensures maximum security for both the administrator and the user with respect to important or critical services, provided any of the other accounts have money in them.

In addition to paying for certain services, the administrator may choose to move units of measure, such as airtime and service units, between accounts associated with a master account. For example, the administrator may manually transfer $10 USD from the master account to a device account at any time, or the administrator may set up an automatic transfer of specified amounts at specified times. In the context of a parent administrator and a child user, a transfer of money from the master account to the device account may be structured to mirror a real-world "allowance." The administrator may also move units between different device account or even permit or control how different users "trade" units between their device accounts. For example, two employees might trade units between their accounts or two children might trade electronic toys, merchandise, phone usage units, or funds for their phones through their device accounts. A service provider might also automatically, periodically or occasionally move credits to a account, either from another account or some other sources under the service provider's control, that may be used to pay for services for loyalty-building, usage incentive, marketing, goodwill, or other purposes.

As previously referenced, FIG. 3 illustrates how an administrator may control or filter features or functions associated with a subscribers phone, in that case who the subscriber can call or not, and who pays for which calls, but may also be configured to enable the administrator to control more features and functions, such as filtering content. Alternatively, a separate application or web page 50 may be established to enable the administrator to control various additional features, function or content, as illustrated in FIGS. 4A and 4B, through a Feature Manager, which may also be part of the master account. As shown in FIG. 4A, the administrator of a device account for a subscriber named Mike is given the ability to manage five additional features and/or content associated with such features in relation to Mike's Kajeet® phone (kajeet is a registered trademark of kajeet, Inc.), such as certain types of downloads 52 (e.g., ringtones, wallpaper, games and applications), feeds 54, mobile web surfing 56, picture messaging 58 and instant messaging 60.

For example, Mike's parent may decide that picture messaging is too dangerous for Mike because of his age and decide to disable that feature. To do so, as illustrated in FIG. 4A, the parent would select the "Edit Setting" link with picture messaging 58, and then change the setting from its current setting of "Allowed" to "Not Allowed," as is the case with mobile web surfing 54 as shown in FIG. 4A. Mike's parent may likewise decide to enable an instant messaging subscription. As shown in FIG. 4A, instant messaging 60 is currently set to "Unlimited Monthly," but it could be set to "Not Allowed" or "50 Message/Month" or "$10/Month," or almost any other setting that made sense to use.

While any number of requests from a device, such as requests to view a URL, open content like a streaming video, or access an email server, may be allowed or denied based upon policies established and managed at the master account level, such filtering may also be accomplished at the device account level, or through a grouping of device accounts designated by the administrator. Filtering may also be accomplished by establishing filter groups, as further disclosed with respect to FIGS. 4B and 14, that establish different levels of filtering for devices based on selections made by the administrator.

Filtering need not only be limited to filtering content, filtering may also be used for consumption management. For example, while a filter may be used to block video streaming so as to block inappropriate content, such as pornography videos, filters on video streaming may also be used to eliminate or control high bandwidth or high cost cellular data usage and/or otherwise eliminate workplace distractions. Also, similar to the redirection disclosure set forth below, filtering may be used once a limit has been approached or has been hit (either as the device account level or the master account level), to throttle data consumption or other activities so as so as to discourage or reduce certain activities. For example, if a daily limit on a device account is reached, the filter instituted by the Feature Manager may kick in to limit access, limit how much data can be sent to the device over some period of time, limit access to only certain websites, such as the corporate website, an email website, and a sales support website, but block access to any other websites.

FIG. 4B illustrates an embodiment of a web page that may allow a parent or administrator to manage the cellular data web access of a device user. As illustrated, the web page shown in FIG. 4B allows a parent to manage a user's (Ben's) device access to and/or ability to purchase various content, data, features, etc. from his device ("Conquer™"). Initially, the administrator has a number of options that allow the administrator to make broad choices about how much cellular data web access the device is to be given. For example, if the administrator selects the "All Traffic Off" option, the device is not allowed to access any websites or applications, but if the administrator selects the "Open Internet" option, the device is allowed to access all websites and applications. A third option allows the administrator to customize the level of access according to some additional options that are configured to provide access that is appropriate for devices with users within a variety of age ranges.

Although there are many different ways in which an administrator may be given the ability to customize access level, the kajeet Smart Blocker™ option illustrated in FIG. 4B provides one embodiment. This embodiment gives the administrator the ability to block websites that fall into various categories, including websites that are unsecured, inappropriate keyword searches, pornography and other forms of adult websites, extreme websites that do not constitute pornography but are nevertheless inappropriate for certain device users, websites that include illegal and illicit content, websites that include information that promote substance abuse and alcohol, websites that include profanity, social networking websites, websites that provide access to instant messaging, web chat and email, websites that provide access to entertainment and game applications, websites that include applications available for the ANDROID phone, or any of a number of other websites. Links may be provided that allow the administrator to understand the type of content blocked under each of the categories. The location of a device may also be used to determine access levels, functionality, etc. For example, certain content or all content and certain web sites or all web sites can be blocked by the administrator(s) based on the location of the user, whether or not combined with the time of day.

As noted above, options allow the administrator to select some pre-selected options, including the college and above option, which only blocks unsecured websites, the high school option, which allows profanity websites and other types of communicative, social and entertainment websites, but blocks more adult websites, the middle school option and the K-5th grade option, which are increasingly more restrictive. The final option illustrated is strict filtering, which blocks everything but the other types of websites not otherwise blocked. An option not illustrated, but within the scope of the present embodiment, is to allow an administrator to select the categories that the administrator wants to block on a one by one basis. For example, the administrator may allow entertainment and games, profanity and extreme websites, while blocking everything else. Also, while the embodiment illustrated in FIG. 4B is directed to cellular access, similar concepts may be directed to other forms of wireless access, such as WiFi.

The parent may also have the option of enabling or disabling a group of services all at once, as illustrated in FIG. 5. In this case, when the "Edit Setting" link for feeds 54 is selected, a news feeds page 70 is displayed that presented the parent with the ability allow or disallow feeds, which are a form of text messaging. As shown in FIG. 5, turning off feeds may disable all SMS or text messaging, not just the feeds described on page 70. Naturally, feeds page 70 may be set up differently, so that text messaging was allowed, except for text messages being sent by kajeet, or maybe only certain types of text messages sent from kajeet—the options are truly endless. Likewise, any feature may be established to be configured by the user in many different ways. For example, instead of having separate settings for downloads 52, mobile web surfing 56, and instant messaging 60, all three of these features may be disabled with a single "off" switch, button, etc.

The actual users of the phone may also have the same or similar options with respect to the feature manager as the administrator, but the administrator may have the ability to override the user and/or a sub-administrator and/or prevent the user/sub-administrator from doing something in the future. Alternatively, the user may have functions that they may enable on their own. For example, a child using a cell phone might have the ability to sign up for Instant Messaging 60, but the parent might decide that it costs too much money, turn the subscription off, and prevent the child from signing up for it again. Likewise, a child may be able to turn on ringtones and wallpaper downloads 52, which the parent may then turn off if needed, but only the parent may turn on games and applications. As previously stated, the combination of options is unlimited.

Further enhancements to the Feature Manager may include the ability to limit how much of a specific feature may be used, when it may be used, picking a group of users attached to an account that the settings apply to, etc.

As previously noted, a service provider may also establish other types of accounts, such as demonstration accounts. Although the global rules and local rules determine the interaction between device accounts and master account, as additional types of accounts are added, a hierarchy between the accounts would be required to ensure that requested services were taken from the most appropriate account first. Under this hierarchy, before the global or local rules were checked to determine which account was designated by the administrator to pay for a service, a promotional account would be checked to determine if the service would be covered by the promotional account. For example, if a promotion involved giving 10 free voice minutes to a user, those 10 minutes would be placed in a "voice" promotional account that would then be used first before determining whether additional minutes would be taken from the device account or the master account.

However, the global and local rules may still need to be checked to make sure that the service was permitted. This prevents, for example, certain accounts from being used to call a 900-number when calls to 900-numbers would otherwise be blocked by the global rules.

As discussed above with respect to Grandma's account in FIG. 3, a dynamic account would be an account that was set up by someone, like a grandparent, but that was not necessarily tied to any particular user or device/phone number. Like the other types of accounts, a dynamic account may be filled with funds or units and used to enable a variety of services for a number of other users or the user of the dynamic account by either being associated with one or more devices or one or more accounts. To prevent conflicts with a master account or a device account, a dynamic account may not be able to authorize services for a user that were blocked by the administrator, but may pay for those services that were allowed. A dynamic account may also be configured to take precedence over a promotional account or even a device account with respect to paying for services, or could simply be used as an additional backup account in the unlikely event all of the other accounts for a phone were not available, as previously described.

Although the accounts described herein are described in the context of being used with a mobile device, particularly a pre-paid cellular phone, accounts may be associated with any type of device, as described above. Some features of accounts include: (1) that they enable management or control of a device; (2) that each device requires at least two accounts to be associated with it, at least one device account and at least one master account; (3) that an order of precedence can be established between the accounts, as to which account pays for what, and any account may be used to back up a payment by a second account in the event the second account is low on units; and (4) that local rules and global rules can be established for the accounts that enable the administrator to manage the functions of a device in many different ways, including who can be contacted, what transactions are permitted, what time of day the device and features/functions may be used, what features or functions are enabled, etc. Global rules and local rules may be applied in order, so as to result in two separate decisions, or at the same time as a single decision (e.g., if local rule X is true and global rule Y is true, then allow the function to proceed).

Figure 12:
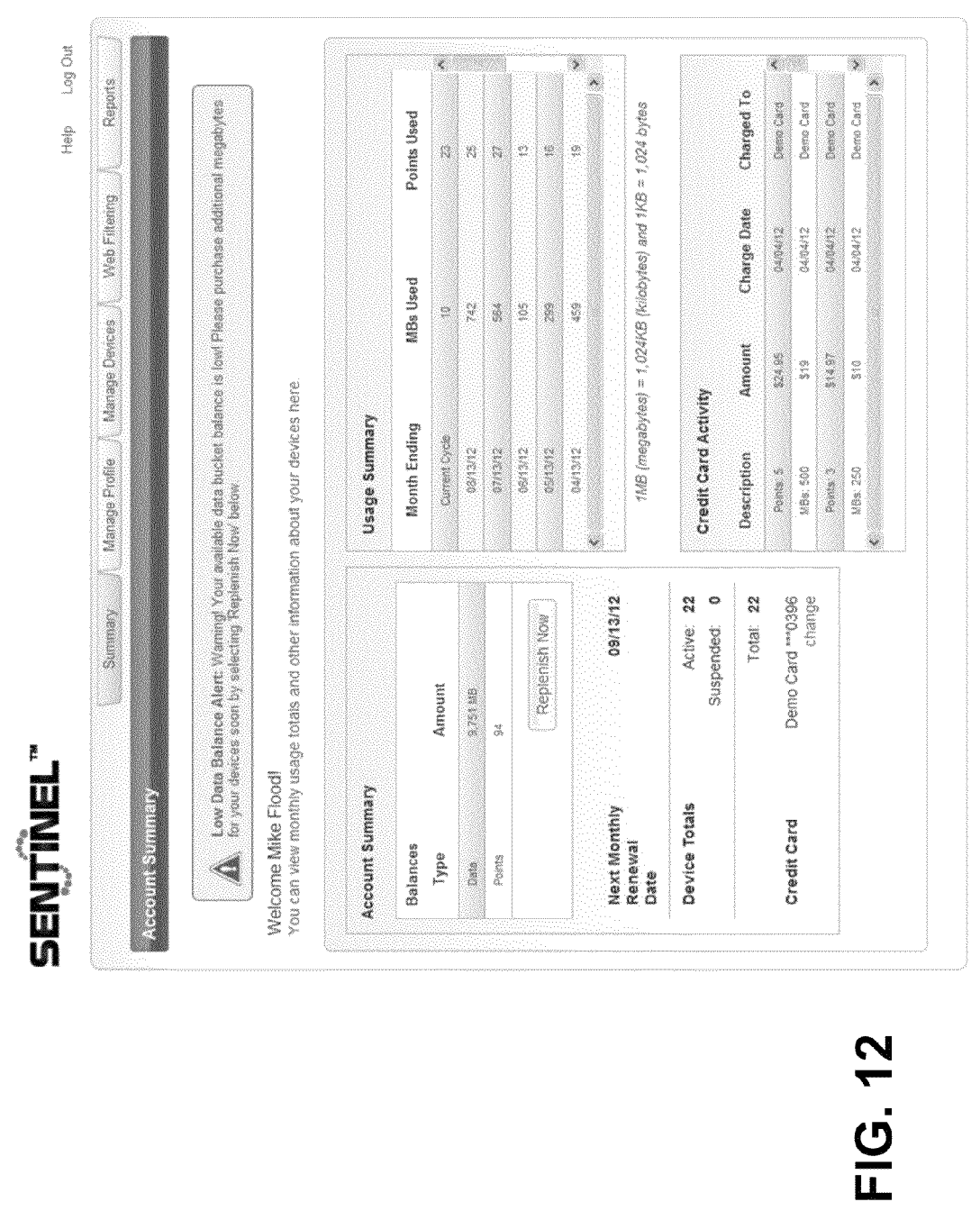

Two methods of refilling an account are illustrated in FIG. 6 and another is illustrated in FIG. 12, further discussed below. In FIG. 6, the manual refill area 80 may allow the administrator/user to decide whose account is going to be refilled, how much is to be added, and the method of payment, such as a credit card, PayPal®, or a transfer of units from another account. Transfers may be paid for and arranged in other ways as well, including the transfer of units from a phone or device on another network. For example, if someone had the phone number of a user, units may be transferred to the device account by accessing a website (as shown in FIG. 7 below) or calling customer service to enable the fund transfer. Units could also be transferred from a person's cell phone to an account by charging the amount of the cost of the transfer to that person's cell phone bill, like mobile-commerce (M-commerce) payments or other forms of micropayments. The automatic-refill area 82 likewise allows the administrator/user to select an account and to automatically add units to the account when the account gets to a certain balance level, or every month at a specified time, or every week on a specified day. Automatic-refills may be paid in all of the different ways in which manual refills are paid. If the credit card to be charged needs to be added or changed, the hypertext 84 would be selected. If the person making the refill was happy with what they had entered, the hypertext 86 would be selected.

Automatic-refills may also be added to a base plan. For instance, a customer buying a $15 recurring plan can increase that recurring plan by an extra amount that is allocated to a specific account, a specific service, or a specific product. The customer can pay $16.50, with the extra $1.50 going into an account for text messaging, or into an account for the customer's child, etc.

FIG. 7 illustrates a gift refill webpage that may enable any person to add units to a device account as a gift. Gifts accounts may be used for giving gifts or alternatively for receiving gifts, and would work effectively the same regardless of the direction of giving. As shown in FIG. 7, in the gift refill area 90, as long as the person using the webpage knows the phone number of the phone associated with the device account, that person may add a gift amount, tell the user who made the gift to them, and even send the user a message. Payment area 92 enables anyone wishing to make a gift of an account refill to register and provide payment information (a credit card is shown, but an account transfer or some other method of payment may also be used) to pay for the refill and for future use.

FIGS. 3-7 illustrate the feature management interface accessible via a website in accordance with an embodiment. However, access controls for monitoring, customization of features, usage policy setting, location tracking, budgeting and account management, and communication with a particular device may be supported via various interfaces, in addition to via a website. Access controls include monitoring, control, feature and usage policy settings, location control, budgeting, account management, and communication with a child's device. For example, as further illustrated and explained in reference to FIG. 10, a FACEBOOK application may be used to send a text messages or other communications to a user, to check the balance and recent activity for a user's device, to track the location of the user, to send automated reminders, to transfer balances, and to purchase and send downloads to a user's device as gifts. Gifts can include applications, ringtones, wallpapers, music, videos, etc. Similar access controls can also be provided via a plurality of user interface layers and a plurality of devices. The plurality of devices includes the IPHONE device, ANDROID devices, SYMBIAN devices, BLACKBERRY devices, among others. The plurality of user interface layers include social networking sites, desktop applications, mobile device applications, desktop widgets, and web widgets.

While limits on usage of services and applications were discussed above based on one or more conditions, in yet another embodiment usage of services and applications may be controlled based on an allocation per period of time or other factors. A device may have a monthly amount for an application or service, such as a monthly amount of 1000 text messages per month, monthly amount of bandwidth utilized or data usage, expressed in any size of bytes of data or some other form. However, rather than allowing a user to spend the total monthly amount in less than one month, the monthly amount may be allocated on a per-day basis, a per-week basis, or on a basis of time configured by a user, such as allocations per two days, per two weeks, etc. This enables applications and services to be controlled with great flexibility. For example, a family phone plan may have a total of 1000 text messages per month, but the parent may decide to impose a daily limit of 20 text messages on the child's phone to avoid having the child incur extra fees due to excessive texting, or personally using all of the text message allotment that is intended to be shared with others.

When usage limits are based on time, such limits need not be based on a time period applicable to a master account. For example, an individual device associated with a master account may have a daily data limit of 50 megabytes, a weekly data limit of 200 megabytes, and a monthly data limit of 500 megabytes. The data limits may also be controlled as separate accounts such that each data limit could be added to or decremented from independent of other accounts. The device account may also be associated with a master account that has an overall data limit. Accordingly, when 1 megabyte of data is used by a device, four different accounts may be decremented at the same time, the master account, the daily data limit account, the weekly data limit account, and the monthly data limit account. If more than one device was associated with the master account, the master account may be further decremented at the same time by usage generated by these other devices. In this example, the daily data limit, weekly data limit, and monthly data limit accounts are all consumption limited accounts. Only the master account is decremented for payment (a fiduciary limited account), but it too may be a consumption limited account or have a sub account that is consumption limited. Hence, the master account may be charged some financial amount and have a data limit account decremented at the same time for the same transaction, but in two completely different ways.

Usage limits, all of which may be managed by different subaccounts within a device account or a master account, may be set based on a plurality of conditions, including limits based on the type of device, the user of the device, the contact communicating with the device, a time of day, a day of the week, etc. For instance, a parent may create a policy that sets a daily text message limit of 100 text messages, but with the number of text messages limited to only five during school hours or during a particular time of day. Similar daily limits and allocations per time period may be imposed on calling minutes, data usage, etc. Other usage limits may be based on business, environmental, governmental and other conditions or factors. For example, a tornado warning or touchdown, a hurricane, earthquake or other disaster in an area may turn off all or impose certain limits on devices in order to insure that necessary communications were possible. Likewise, a change from Defcon 2 to Defcon 3 may change limits for military personnel, a change in terrorist warning alerts may change limits for people in an airport, etc.

Usage limits may also be imposed by one or more administrators, assuming that the override function is enabled. An educational institution, for example, may purchase 1 gigabyte of data service for each student per month, while setting an allocated daily limit of 50 MB, ensuring that students do not run out of data access mid-month. The administrator may also be given control over unused services relative to the daily limit (such as pooling services unused), setting hard limits on the unused services, or allowing unused services to carry over to the next day or the next corresponding time period. For example, if a child had a daily limit of 100 texts, and only used 5 text messages in one day, the unused 95 texts may be allowed to rollover to the next day, so that the next day imposes a daily limit of 195 texts. The rollover function may be enabled or disabled by the administrator. The administrator may further control the distribution of unused services to a temporary pool or to some other wallet. For example, if there are 95 unused texts, then those unused 95 texts may be collected in a prize pool to be awarded at a future point in time. If a child received good grades, then the administrator may have the option of give the child a number of texts from the prize pool to be used at any time, regardless of the daily limit. The texts collected in the prize pool may also be distributed to other users or saved in case other users exceeded their corresponding quota.

The imposing of the daily limit supports careful time and data-consumption budgeting by kids, students, and even by adults who find the need for the imposed limits to avoid going over budget. For children and students, it encourages personal responsibility and management, teaching them to do their homework efficiently and not to waste time on extraneous activities that require use of bandwidth.

In one embodiment, the charge for a single service, application, or even an entire service plan may be distributed over one or more accounts. In the simplest example, a parent and the child can split the cost of a service plan 50/50. Similarly, the cost for an individual service or product, such as the cost for a game, an application for a mobile device, a music download, a video download, etc., can be split 50/50 between the parent and the child. It is further noted that cost need not be distributed equally over one or more accounts. Instead, a device account may cover 60% of the cost while a master account may cover 40% of the cost.

The charge or cost of a service, application, or a service plan may also be divided based on usage history. For instance, if a child typically spends 70% of the total text messages in a text messaging plan, compared to 30% text messaging by the parent, then the cost for text messaging can be allocated such that the child pays 70% of the text messaging plan while the parent pays for 30% of the text messaging plan. The distribution of charges may also be used as a means of rewarding a child. For example, if a child typically pays on their own for extra data services, such as media and application downloads, then the parent may pay 50% of the total cost for data services for a month as a reward. The proportioned charge may also be useful for portable electronic devices distributed by a company to its employees. In such a case, the company may pay for 50% of bandwidth consumed by a user during working hours.

Rewards may also be utilized in other ways. For example, in an embodiment, a child is required by a parent to complete two hours of studying (e.g., two hours of use of an educational application, textbook, digital textbook, or website, with the device or without the device and measured through other means). As a reward, upon completion of the required studying, the student may be provided with unlimited texting access on the device for 24 hours. In another embodiment, a child may be required to take an online test, or complete some other quantitative assignment. Instead of rewarding the child for completing the task, the child may only be rewarded upon reaching a qualitative objective (e.g., a test score above 80%). In each embodiment, the rewards may vary significantly, from obtaining access to a game (e.g., entertainment application), obtaining internet access beyond the educational website, obtaining credits toward other device uses, obtaining extended periods of utilization of the device outside of normal restrictions, etc.

As indicated above, a device account may be used to enable a user to pay for additional products and services. For instance, a parent can associate a device account with a school issued device given to the child. The parent may fill that account with credits enabling the child to pay for lunches, purchase e-books during e-book sales, or purchase access to supplemental subscriptions, such as research websites, encyclopedias, or optional courses that are not school-system funded. The device account may also be used to enable the child to pay for parentally sponsored or funded web-based activities. For instance, if a fee is needed for a field trip, the device account may be used to pay for such expenses. And, while the term "child" is used to refer to students, it is anticipated that embodiments disclosed herein may be implemented in adult school environments, such as colleges, universities, training schools, military academies, etc., whether the students are adults, not children.

As noted above, embodiments of the tracking, administration and monitoring of services are not limited to communication devices. Policy management and enforcement as described herein may also be applied to features of electronic devices accessible through the devices. For instance, a parent may manage a child's access to social networking sites, such as a FACEBOOK site, via the child's desktop computer. The parent may configure and create rules that limit the time of day when the social network site can be accessed, limit the features that can be accessed on the social network site, limiting the contacts and "friends" in the social network site, etc. The policy management may also maintain a log enabling the administrator or parent to monitor usage of certain applications or certain web sites. In terms of a social networking site, monitoring usage would enable a parent to track the number of posts made by a child per day, the cumulative usage time, the amount of time spent playing video games via the social network site, and other limitations that may evolve as social networking types of services and websites evolve.

The parent/administrator may even specify rules to monitor other users who attempt to contact the child. For instance, if the child receives a message or a friend request from a user who meets a number of criteria specified in a rule or in a contact filter, then an alert may be sent to the parent, or a message may be stored in the feature management interface for the parent to see next time the parent accesses the feature management interface. Rules and corresponding alerts may be created for a plurality of conditions, such as when any adult user sends a message or a friend request to the child. Metadata from device usage may be used to create dynamic controls, such as through a learning system (e.g., using a neural network algorithm or other learning algorithm) that uses data from devices or the policy decider/enforcers to develop better rules for some or all devices, deciders or enforcers going forward. Policy management may be used to allow broadcast messages, through any or all forms of communication (voice, data, URL, SMS, etc., or all of these at once) to communicate urgent public safety announcements, Amber alerts, weather warnings, civil defense messages, etc. Policy management may also be used to enforce "least cost routing" rules for communication functions, or other similar types of rules. For example, a least cost routing rule may require the device or the decider/enforcer system to compare the relative cost of using different networks detected as being available to the device and selecting the least costly route for a communication function(s) to be performed. For example, within a school environment, there might be an available, free WiFi network or an available, but more costly, Radio Access Network, so the rule may specify that the device should use the WiFi network for a communication function. The possibilities are limitless, with the rules being as detailed as necessary or as desired by the administrator/parent.

While the example above refers to a social networking site, similar rules may be applied to control and monitor usage of other websites, desktop applications, video game applications, etc. As indicated above, access and usage of services or applications may be controlled based on the time of day or the day of the week. For instance, the parent may specify that the child is not allowed to access social network sites after 10 pm. Similarly, the parent may limit usage of certain applications to a specified amount, such as limiting access to a video game to at most 1 hour per day.

As initially described above, embodiments further include location based controls. Voice, text, data, and who pays for the respective services and applications can be controlled by location information, which may be supplied by GPS, AGPS, RFID, wireless signal strengths, ZIGBEE, or any of a number of other location determining technologies. Location rules or policies may also be combined with rules and policies based on time of day. For instance, calls only to emergency numbers may be allowed while a child is on school property. Alternatively, the school may pay for various usage costs when the child is on school property, such as network usage costs. The services may also be limited depending on the location and who is paying for services. When a child is in school, data access may be limited to levels selected by the educational site. In a company, while the employee is on work premises, data usage and other services may be limited. For instance, while employees are at work, employees may be allowed to visit certain websites, but not websites that consume a high level of bandwidth. Alternatively, rather than listing websites that are allowed and websites that are not allowed, an administrator may instead set a bandwidth limit on devices used by employees while at work.

In a further embodiment, the policy decider may be provided with location information and decide that the policy enforcer is to take control of the device until the location information changes in some specified way. For example, when a child enters a particular classroom or school grounds, the screen of their device may be reconfigured (with information, applications, icons linking specific applications, web sites, content, programs, etc.) so as to conform with the specifications set by the administrator, who may be the teacher assigned to that classroom, or some other educational authority.

Tags or meta-data may also be used to identify an electronic device, such as a computer or a mobile device, as being owned by a child or a minor. While a number of websites use the meta tag "rating" to rate the appropriateness of the content with regard to a general audience, a mature audience, or a minor audience, it is generally the website operators that provide that rating (so trust can be an issue) and it is up to the client device to take action based on the rating of the website. However, not all websites include such ratings, and even in those cases when the websites do include such ratings, the client device, or even the user, may choose to ignore such rating. Therefore, even if a website is rated to have mature content, there is nothing stopping the user from accessing the website. In some cases, the user is required to enter their birth date to verify whether the user is a minor. However, this verification simply consists of having the user enter a birth date that is not verified, and hence a user could provide a false birth date to access the website. Thus, even if a website includes a content rating, the website does not have any control over what is displayed to the client device and does not have the ability to prevent a minor from accessing the website if the minor is intent on doing so. Embodiments resolve this problem by tagging a device as being used by a minor or a child. This information may be sent with the initial client request for a website, or in a subsequent request to the website. Based on the tag received, the website may then decide whether to make the website content accessible.

In embodiments, instead of relying on a website making content available to determine whether content may be accessed by a device based on information provided by that device, or relying on the website to broadcast rating information about its own content so the device can decide whether to allow access to that content, a website controlled by the device provider, a service provider to the device, or a third party, may gather information about other websites and broadcast that information to the device or otherwise use that information to control the device's access to other websites. For example, a type of rating website may collect information from many different sources that allows that website to rate other websites based on the domain name of the websites and the content available at each of those websites and then transmit that information to the device (which is configured to listen to the broadcast) so as to allow the device to manage user access the websites. Referring back to FIG. 4B, an example of how such website filtering may work is illustrated. As shown in FIG. 4B, the categories of website content that may be controlled through the Kajeet Smart Blocker is determined by collecting information about the different types of websites and then categorizing them accordingly, so access to such websites may be appropriately controlled.

The tag or meta-data may provide a plurality of information. The information may include personally identifying information of the user, when appropriate, or in many cases non-personally identifying information of the user, such as the age of the user, the sex of the user, the jurisdiction of the user, etc. In some embodiments, a tag may specify that mature content is not to be displayed by the device, thereby enabling the remote service or website to take a corresponding action without having to obtain any other information about the user of the client device. Taxes for on-line transactions may likewise be charged depending on a jurisdiction that is included in a tag associated with a device.

Once a website, or the remote server hosting an application or service, has received the tag or meta-data identifying the device as being that of a minor, then the website may take the necessary steps to avoid presenting the website content to the user. For instance, certain mature websites ask the user whether the user is 18 or over, and if the user answers that he/she is under 18, then the user is directed to a different website or otherwise denied access. However, as noted above, nothing stops the user from providing false information and selecting the 18 and over option. On the other hand, once a website has parsed the tag or meta-data identifying the client device as being owned by a minor, the website may redirect the user to a different website without prompting the user. Alternatively, the website may display non-offensive material, a blank web-page, an HTTP error message, some other content, etc. Similar actions may be taken when the tag or meta-data provides other information. For example, if the tag or meta-data includes a rule specifying that profanity is not to be displayed to the client device, then the remote website may redirect the user to a different website, it may display an alternative website without the use of profanity, or may blank spaces or advertisements in place of the profane words when the website is displayed.

The tag or meta-data may follow a plurality of specifications and standards. The meta-data may be formatted in raw text, comma-separated values, XML, HTML, YAML, JSON, or any other data format or mark-up language. What is important is for common protocols to be used to enable a device to communicate the proper meta-information to a website or other remote service or application. In an embodiment websites may comply with a standard of how to react. For instance, a regulation could be added to the Children's Online Privacy Protection Act (COPPA) requiring the use of a tag or meta-data for devices used by children or minors.

Embodiments may further enable location detection and location tracking for a plurality of users, as further described above and below, including the ability to locate a phone from a plurality of carriers and identify the speed of the device. Location tracking may be used for checking whether a user arrived at a certain destination, whether a user followed a specific route, or whether the user has moved in a period of time. A feature enabling an administrator to check whether a user arrived at a certain destination may be used by a parent to determine whether a child arrived safely to school, arrived safely at home, or arrived at some other destination. An employer may use the location tracking to determine whether an employee is going to the intended destinations rather than taking unnecessary side trips, or even to analyze the routes followed by employees in order to find alternative or more efficient routes.

The simple tracking of whether a user has moved may be used by an individual to check on ill or elderly users or relatives. As indicated above, alerts may be generated in response to one or more conditions associated with location. For instance, an alert may be sent when a user departs from a starting location and a second alert may be sent when the user arrives at an ending location. Similarly, if the location of an elderly or sick relative has not moved for a period of time, this may trigger an alert to be sent to one or more users or emergency contacts. The alert may consist of a voice message, a text message, an email, an instant message, a message via a social networking website, or a message via some other website.

Location tracking may also have uses for educational purposes. Policy settings may permit the publication of geocodes to specifically authorized users or applications. A parent may specify that the child's teacher, tutor, or any individual from an educational institution may obtain location information for the device of the child. The parent may also set the policy to enable one or more apps access to the location information, enabling a teacher's application or some other application used by an educational institution to obtain the location information of the device of the child. Such functionality may enable a teacher to perform an instantaneous location-based roster-check during class, during recess, during field trips, etc., or an employer to verify the location of employees and contractors in the event of an emergency evacuation, etc. In a particular embodiment, if a child is not present, then an alert may be sent from the teacher's device to the child's device notifying the child to approach the teacher. In such an embodiment the alert sent by the teacher may further include the teacher's location, enabling the child to know where to meet the teacher.

In embodiments, the policy manager may meet Children's Internet Protection Act (CIPA) compliance under certain conditions, including with the addition of filtering options available for purchase by parents. Filtering solutions may also consist of a white listing of sites, such as educationally provided sites, parent-paid sites, and additional paid usage.

Accounts provide granular control over usage and spending by one or more users. In the case of a parent and a child, accounts provide a high degree of control over the usage and spending by the child. The controls may include enabling a device to use WiFi when available, turning off the device when it is not appropriate for the device to be used, turning off a communication device when a child is in school. These controls may be based on the time of day, the day of the week, the day of the year, and the location. Controls further may provide alerts to be associated with a plurality of events, including events associated with certain usage and spending events. For instance, a simple alert may be set up that sends a text message to a parent whenever a child sends more than 100 text messages in a day or the transmission of any image using the device. A more complex alert may consist of sending a text message whenever a child sends a text message or image during school hours or during an after-school tutoring session.

Spending, data and other types of limits may be hard or soft. Hard limits do not allow a user to do something once a limit has been reached. For example, if a limit is being approached or have been reached (such as a daily data limit or a master account limit), a web browser request, for example, may result in the device being redirected to another website, such as an appropriate error page that instructs the user that a limit has almost been reached or has been reached and instructing the user to wait some period of time until the limit has been reset or otherwise resolves. Alerts and redirections to the administrator may include instructions about a master account or one or more subaccounts being low or empty and needing to be refilled in some manner. In some cases, the refill may be automatic, such as when an appropriate time period has passed, or based on a credit card or other payment authorization being on file with the service provider, while in other cases the refill may be completely discretionary.

In a parent-child case, if a child is given a hard daily limit of 100 text messages, then the child is allowed to send at most 100 text messages per day. Alternatively, a soft limit may notify the user that the limit has been reached, in addition to providing the user with an extra quota for the day. For instance, if a user sends 100 text messages during a day and the user has a daily limit of 100 messages, the user may be notified that the daily limit has been reached and given five additional texts (or some other amount designated by the administrator) that may be used for the remainder of the day. Alternatively, usage can be throttled after a user has reached a daily limit. For instance, once the daily limit has been reached, the user may only be allowed to send one text message and receive one text message once per hour for the remainder of the day. Alerts and redirects can also be associated with daily limits, informing the user or the administrator when the user has exceeded the limit, or is approaching the daily limit. Similar to alerts and redirects associated with other events, the alerts and redirects may be configured extensively by the user or an administrator. For instance, the administrator may set up a first alert to be sent to the user once the user has used 80% of the daily limit, a second alert to be sent to the user once the user has used 90% of the daily limit, and a third alert sent to the user and to the administrator once the user has used all of the daily limit.

In one embodiment, the usage patterns relating to voice calls, texting, data consumption, content and application usage, location and context (prior—and post—user activities) associated with one or more devices may be captured in a database for analysis. The data captured in the database may be used by a parent to examine the consumption patterns and usage patterns of the family members. An employer may similarly examine the database to determine which employees or departments use the most services or applications, or even to determine which services and applications are the most used and least used. An education institution may use such a database to search for correlations between grades and other learning outcomes with precise elements of device usage by a user or population of users. The database may also be used to monitor and control policies. For instance, after examining the database it may be determined that bandwidth consumption needs to be limited daily due to increased bandwidth consumption costs. Among other factors, the database may provide insight as to what services or applications were consumed and when the particular services or applications were consumed. All of the data in the database may also be examined for research purposes. In particular, the aggregate behavioral information may be valuable to employers, organizations, advertisers, educational institutions, and researchers.

In one embodiment, in association with a device controlled by the policy decider and the policy enforcer disclosed herein, an administrator may have pre-set permissions enabling the administrator to take control of the screen output of the device, gain access to the files and applications in the device, etc. In a classroom environment, the teacher may take control of the screen output of a device assigned to one of the students, thus allowing other students to see the screen output of the selected student. This functionality may further enable the teacher to share and review the student's work, and to monitor the student at various times throughout the day.

Yet another embodiment is directed to a policy/control system on a device that uses an encrypted digital certification to verify the identity of the user, and consequently may impose a set of policies and rules associated with access to a plurality of resources. The encrypted digital certification, which may also consist of a simple pass code, may distributed to a plurality of users. The encrypted digital certification may be stored on each user's device. Whenever a user wishes to use the device to gain access to the plurality of resources, the encrypted digital certification may be transmitted from the device to the system or the host of the plurality of resources. If the digital certification is validated, an application may be automatically downloaded to the device, with the application imposing a set of policies and controls on the device associated with access to the resources. In other words, such an embodiment allows for a policy/control system to be imposed by an entity on various devices accessing the entity's system. In an educational institution setting, this certification method may allow the educational institution to impose policies on devices of faculty, students, and guests accessing and making use of the educational institution's resources. Different policies may be distributed depending on the type of user. Administrative members may receive a different set of policies than faculty, and students may receive yet another set of policies different than the set of policies assigned to faculty and administrative members.

FIG. 8 is a block diagram illustrating the relationship between the policy enforcer(s) with the policy decider(s), and between the policy decider(s) with a plurality of user interface (UI) layers. The policy enforcer may communicate with the policy decider, or one or more policy enforcers communicate with one or more policy deciders, whenever an activity or event occurs on a device managed by the policy/control system described herein. The policy decider may subsequently be accessed and customized via a plurality of UI layers. The UI layers presented in FIG. 8 are not meant to an exhaustive list of UI layers, rather FIG. 8 merely illustrates a representative subset of the various UI layers. The mobile application UI layer may represent interfaces via applications operating on devices, smart phones, etc. The webpage illustrated in FIG. 3 is an example of a website UI layer, where the user may access the website via a plurality of devices, and it is through the website that the user may customize the policy decider.

Figure 10:
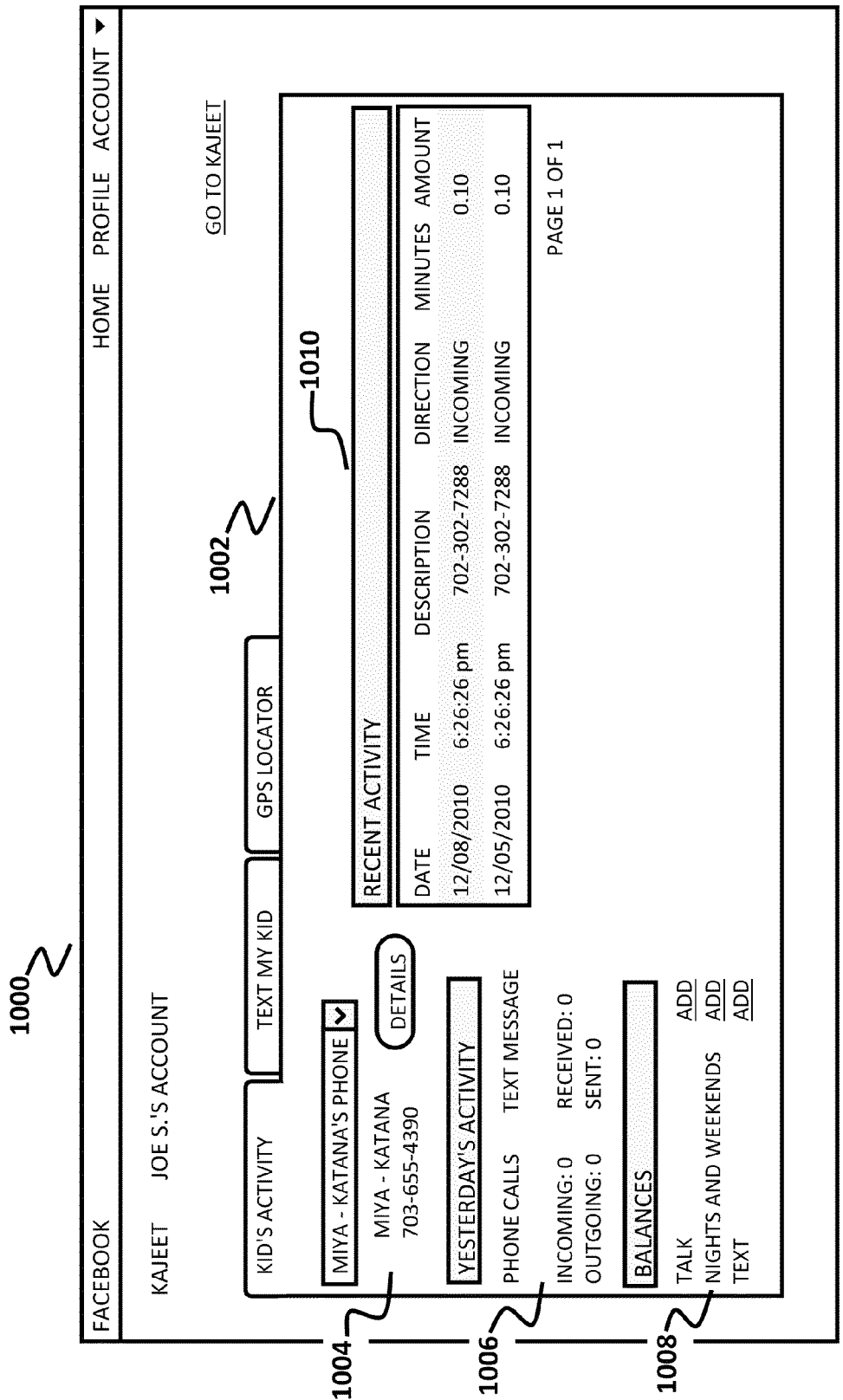
FIG. 10 illustrates a FACEBOOK user interface layer for customizing the policy decider in accordance with an embodiment.

The social network UI layer illustrated in FIG. 8 may allow users to customize the policy decider via social networking websites or via social networking applications. As further described below, FIG. 10 illustrates an example of a social network UI layer for the FACEBOOK website. Other social networking websites include MYSPACE, TWITTER, and LINKEDIN, among others. The YAHOO widget UI layer may allow users to access and customize the policy decider via a desktop widget. The YAHOO widget UI layer is meant to represent the UI layer associated with desktop widgets, mobile widgets, and web widgets, versus just the YAHOO website on its own. Finally, the other application platforms UI layer may encompass other UI layers through which the policy decider may be customized, including a desktop application for a plurality of operating systems, a command line interface, etc.

As indicated above, in FIG. 8, the policy enforcer 802 may communicates with the policy decider 804 whenever an activity or event occurs on a device managed by the feature management described herein. If a user attempts to make a call or otherwise use the device in any way, such as through a mobile application 806 (i.e., ITUNES/ANDROID), a network or website 808, a social network 810, a YAHOO widget or similar type of application 812, or any other application platform 814, such as the Voice Over the Internet Protocol, text, SMS, etc., all of which are referred to herein as "making the call" for ease of understanding, then the policy enforcer 802 may first query the policy decider 804 to determine whether the user is allowed to make the call. As described above, the policy decider 804 may maintain a plurality of rules including a user's control preferences associated with one or more devices. The policy decider 804 may communicate the rule or a decision associated with a request, with the policy enforcer 802 subsequently taking the appropriate actions to implement the decision. Thus, if the call is to a contact listed on an allowed calling list, then the policy enforcer 802 allows the call. On the other hand, if the phone call is to a contact listed on a blocked calling list, then the policy enforcer 802 blocks the call. The policy decider 804 can check a plurality of rules before issuing a policy decision. If the call to a contact on the allowed calling list is made during school hours, when only emergency calls are allowed, then the call may not be allowed.

FIG. 9 is a block diagram illustrating in further detail the relationship that may exist between the policy decider 804 and a plurality of policy enforcers 802. Rather than having a single policy enforcer 802, in a particular embodiment the policy decider 804 can interact with a plurality of policy enforcers 816, or vice versa, with each policy enforcer 816 may be customized to a particular device, service, or application. The decider 804 may have rules specifying: "do not allow my child to use profanity" or "do not allow my child to use sexting" or "do not allow my child to send naked pictures", etc. Each enforcer 816 may then enforce these one or more rules accordingly, in appropriate circumstances. While the mobile phone enforcer 816 is labeled as the policy enforcer in FIG. 9, it is to be understood that each of the enforcers shown in FIG. 9 are likewise policy enforcers 816, despite not being labeled as such (so as to cut down on labels littering the figure). Mobile phone enforcer 816 may interact with a mobile phone, and may enforce this rule by examining text messages as they are being typed or prior to sending the text messages. The policy enforcer 816 may subsequently enforce the decision communicated by the policy decider 804 by not sending text messages including profanity, not receiving text messages including profanity, by automatically removing the actual profane words from the text message, by automatically removing the entire sentence including the profanity, by notifying the parent via an alert that the child has used profanity, by prompting the child to remove the use of profanity, etc. The actual steps taken to enforce a policy may depend on the actual policy, and on the particular device, service, or application being managed.

A parent or administrator may have the option of defining what constitutes "profanity" by creating their own list of prohibited words. Since some parents might have issues with creating such a list, or might recognize that they do not necessarily know all of the profane words their child could use, the parent may access an external source that provides a constantly updated list of profane words, as word usage changed among young people. The provider of the policy service may also provide such a service where a user need only select an option on a webpage to have one or more sources used for determining profanity. Similar policies may be established for other purposes, such as preventing employees from using the names of the employer's clients in text messages or communicating other types of information. Likewise, a policy may be used to prevent a child from using text message abbreviations, such as "LOL" for "laughing out loud" or "MoS" for "mother over shoulder".

FIG. 9 further illustrates a FACEBOOK enforcer 816, an email enforcer 816, an instant messaging (IM) enforcer 816, and other enforcers 816. The FACEBOOK enforcer is a specific example of an enforcer for a social networking website or application, which as noted above may include the TWITTER website, the MYSPACE website, the LINKEDIN website, etc. The FACEBOOK enforcer, when monitoring profanity, may not allow a child to post status messages or other messages that include profanity. As a further example, the policy decider can include a rule specifying: "do not allow my child to post pictures without admin approval." The FACEBOOK enforcer may subsequently monitor any uploads attempted by the child to the FACEBOOK website. Whenever a picture upload was attempted, an alert may be sent to the parent, the child may be notified to seek parent approval, or the pictures may be queued for approval via one of the policy decider UI layers. These examples are merely illustrative and are meant to showcase the flexibility and scalability of embodiments described herein.

It is also to be understood that the rules may not be stored by the decider 804 in plain English. That is, rather than simply writing a sentence describing a rule, an administrator may be presented with a set of tools that can be used to create the rules. For instance, the administrator may be presented with a "censor" option, with any words or phrases entered within a textbox associated with the censor option being censored. Alternatively, as noted above, the user may simply select a checkbox censoring profanity, with the enforcer automatically checking a database of profane words.

FIG. 9 further illustrates an email enforcer 816, an instant messaging enforcer 816, and other enforcers 816. Other enforcers 816 may include an enforcer for a gaming device, such as a PS3 device, a XBOX device, or a handheld gaming device. As indicated above, the enforcer may also apply to a desktop computer, a laptop, a smart phone, a tablet computer, a portable media player, etc.

In one embodiment, a single policy enforcer 816 may be used for one or more devices, services or applications. For example, the logic associated with enforcing the use of profanity may be the same for all social networking websites. In such a case, rather than having an enforcer for each social networking website, a single enforcer can be applied to a plurality of social networking sites. If necessary, an additional sub-enforcer including implementation specific details to a particular social networking website can be created.

FIG. 10 illustrates the FACEBOOK interface 1000 for feature management and the policy/control system as described herein. The embodiment of the feature management application 1000 may allow a parent to track his/her child's activities associated with a mobile device. However, as has been described above, embodiments may be implemented for other devices, such as a child's gaming device, a child's music player, etc. The embodiment illustrated in FIG. 10 may provide the user with three tabs, with each tab providing different feature control and management. Whenever a tab is selected by the user, the corresponding controls may be displayed within the center panel 1002. The three tabs illustrated are "Kid's Activity," "Text My Kid," and "GPS Locator." The "Kid's Activity" tab displays the activity for a parent's child. Drop down menu 1004 may enable the parent to switch between various devices and users that are tracked by the parent. The currently selected device is "Miya-Katana's Phone." The drop down menu may be filled with the names of all of the parent's children, or it may also be filled with the names of all family members. The drop down menu may also display various devices for a single user. For instance, the drop down menu may also include "Katana's IPOD," "Katana's XBOX," "Mike's PS3," "Mike's Personal Laptop," "Mike's School Laptop," etc.

In FIG. 10, the center panel 1002 may also display a summary of recent activity associated with the device, such as the yesterday's activity subpanel 1006, which may display the number of phone calls and text messages sent and received in the previous day. A balances subpanel 1008 may enable the parent to add to the balance of talk minutes, nights and weekend minutes, and text messages. When the user clicks on the "Add" link in the balances subpanel 1008, the user may be prompted in various ways to add to the various balances, including transferring credits or units from one or more wallets, adding units from a charge card or a credit card, adding or transferring units from a dynamic wallet, or simply having the added balance charged to a bill associated with the parent's device. Finally, the recent activity subpanel 1010 may display recent activity associated with the selected device. The recent activity subpanel 1010 may display the date, time, description, direction, minutes, and amount associated with each event or activity.

It is to be understood that the interface illustrated in FIG. 10 may be customized and varied without departing from the spirit of the invention. For instance, the yesterday's activity subpanel 1006 may cover a different time period, include a separate count for the number of multimedia messages sent and received, etc. Similarly, the balances subpanel 1008 may include the ability to add balances for multimedia messages, for wallpapers, for ring-tones, for music downloads, etc. Finally, it is to be understood that the feature management interface 1000 may display different options based on the type of device currently selected. For instance, if the device selected is a gaming device, such as an XBOX device, then the yesterday's activity subpanel 1006 may display the total amount of hours spent playing games, the total amount of hours spent watching movies, the total amount of megabytes downloaded, the titles of games played, etc. The balances subpanel 1008 may allow the user to add balance credits enabling the child to download video games, music songs, or movies via the XBOX device. Finally, the recent activity subpanel 1010 may show the amount of time that the child spent on each recent activity, such as the amount of time playing a first game, the amount of time playing a second game, the name and charge associated with a recent music download, the name and charge associated with a recent video game download, etc.

The feature management interface 1000 may be configured by the parent based on the degree of control and information the parent is interested in tracking and analyzing. For instance, the parent may add further details to be displayed in the yesterday's activity subpanel 1006, such as the total number of minutes used in incoming calls, the total number of minutes used in outgoing calls, the total number of minutes used in calls with the parent, the total number of minutes used in calls with a specific contact, etc. The yesterday's activity subpanel 1006 itself may be changed so that it presents a summary of activity over a period of time, rather than only displaying activity from the previous day. The parent may be given the option to make the yesterday's activity subpanel 1006 display the activity for the last 2 days, for the last 3 days, for the last n days, or for the current billing cycle. The parent may also have the option of removing information that the parent is not interested in tracking The parent may be interested in detailed activity for text messages, but may choose to hide all activity associated with phone calls.

In the recent activity subpanel 1010, the parent may also customize the fields that are displayed for recent activities or events. The parent may only want to view the date, the description, and the amount spent on each activity. On the other hand, another parent may want to view additional details, such as the start time of the activity or event, the end time of the activity or event, and contact information, if available, associated with the remote user or remote device associated with the activity or event.

While not further illustrated, the "Text My Kid" tab in FIG. 10 may enable the parent to send one or more communications to the user through various means. The communications sent may include text messages, multimedia messages, emails, instant messages, a message sent via a social networking website (such as a message via the FACEBOOK website), etc. The sending of communications is not limited to the sending of messages to a mobile device. Communications may also be sent to other devices manually or automatically. When sending communications manually to another type of device, the parent may first choose the device to receive the communication, followed by the parent choosing the type of communication to use. For instance, if the parent wishes to send a communication to the child's XBOX device, then the parent may manually select the XBOX device from a list of devices associated with the child, followed by a selection of sending a message to the child's XBOX LIVE account. When sending communications automatically, the parent may select the device associated with the child, and the feature management interface may automatically select the appropriate communication to send based on a set of rules. For example, if the device selected is a laptop, then the rules may specify that an email is to be sent. The rules may also depend on one or more status states, such as availability of the child. The instant messaging status of the child in a plurality of websites and applications may be checked first. If the status of the child indicates that he/she is online, then an instant message may be delivered to the child. On the other hand, if the status of the child is offline, then the rules may default to sending an email. In particular, the FACEBOOK application supports threaded texting to communication devices without having to leave the FACEBOOK application.

The "GPS Locator" tab illustrated in FIG. 10 may enable the parent to track the current location of each of the devices managed by the parent, and consequently track the location of the child or other family members. The GPS Locator interface may also enable the user to associate alerts with one or more GPS events. If the child's location is not within a radius of a school property during school hours, then an alert may be sent to the parent. If the child is expected to be at a specific location at a specific time, then an alert may be sent to the parent. As indicated above, the GPS locator may also be used to track movement versus no movement. For instance, if the GPS location of an elderly or ill family member has not changed for a period of time, then an alert may be sent to the parent, to an emergency number, or to one or more other users. The GPS locator may also be particularly useful when a device is stolen. The GPS locator may also be used to determine which applications are publishing GPS information about the device, and who has access to such GPS information.

It is to be understood that while FIG. 10 has been described in the context of a parent managing features of the mobile device of a child, the feature management described in FIG. 10 may also be applicable to an administrator managing a plurality of devices used by one or more users, an employer managing a plurality of devices by employees, etc.

Figure 11:
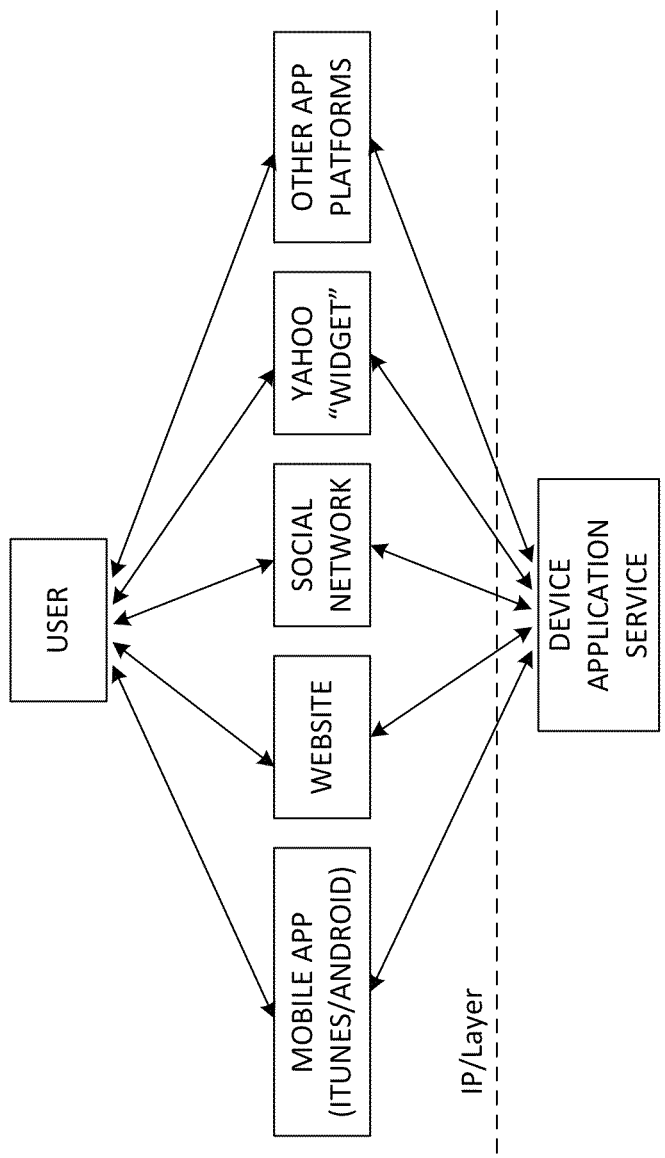
FIG. 11 illustrates a client-server architecture over an IP connection enabling a user to customize the policies for a device via a plurality of user interface layers.

FIG. 11 illustrates an embodiment of the policy/control system described herein implemented within a server-client architecture or within a chip set architecture. A user may customize the policy/control system via a plurality of UI layers or other device layer. The layers may communicate with the corresponding device, application, or service via an IP connection or other layer communication medium, such as within a chip set, within a device's architecture, within an operating system, etc., rather than requiring the communication to take place over an additional network, such as a carrier network.

FIG. 12 is an illustration of another embodiment of a master account summary and control screen. As illustrated, the administrator may see an account summary that lists balances, such a type and amount. In FIG. 12, one type is data and one type is points, where the corresponding amount balances are 9,751 megabytes and 94 points, respectively. As noted above, points are units of measure that may be arbitrary in nature. A point could have a particular monetary value associated with it or some other unit of measure that has nothing to do with money. As shown in FIG. 12, points are associated with United States Dollar values. For example, under the Credit Card Activity section of FIG. 12, a charge on Apr. 4, 2012 for $24.95 purchased 5 points that were then added to points balance amount, which another purchase for $14.97 on the same day added three points to the points balance amount. While points may be associated with certain types of activities, such that points are not decremented when data is used, but are decremented when voice minutes are used or other activities unassociated with data usage are used, points could also be used as a surrogate for data, i.e., so many points per megabyte.

FIG. 12 also illustrates that the administrator had purchased varying amounts of data for varying amounts of Dollars, such as 500 megabytes for $19 and 250 megabytes for $10. At the top of FIG. 12, and alert is illustrated indicating that the data balance amount is low and needs to be replenished. Any of a number of other alerts may be displayed in a similar manner. If the administrator was interested in replenishing the data balance, the administrator may select the "Replenish Now" button displayed within the account summary section and have the data balance replenish by some amount, which may be set in advance or determined at the time of replenishment.

The account summary of FIG. 12 also indicates the total number of devices (22) being managed by the one summary account illustrate, with all 22 devices active and none suspended. The account summary also list some indication of the credit card on file for facilitating payments, the next monthly renewal date, and includes a usage summary indicating how many megabytes of data and points were used during each renewal cycle.

Figure 13:
FIG. 13 illustrates a replenishment screen.

FIG. 13 illustrates an option for replenishing an account. When the administrator selects the "Replenish Now" button in FIG. 12, the screen illustrated in FIG. 13 may be illustrated over the account summary screen of FIG. 12. The replenishment screen of FIG. 13 may give the user or administrator the option to select the type of balance to be replenished, i.e., data, points or some other unit of measure, provides the user or administrator with different payment options, i.e., how many for how much, indicates the payment method to be used (or change to), indicates a total, and allows for cancellation or confirmation of the purchase.

In FIG. 12, 22 devices were being managed by the administrator. FIG. 14 illustrates a screen by which multiple devices could be managed, which may operate on the same principles as illustrated above with respect to FIGS. 3, 4A and 4B. A list of devices under the summary account are provided, as many as 50 or more prescreen or page shown, and certain information about each device, such as the associated phone number, the name of the device, the filter group selected for the device (if any), the monthly data limit, the daily data limit, the total of data used so far in the month and the total of data used so far in a day. This information is merely illustrative and many other combinations of information could be illustrated instead. The administrator may also select the device and open additional screens, such as the Device Details screen shown below the list of devices, with more information and controls that may allow the administrator to change settings, accounts, limits, usage cycles, etc. As illustrated in FIG. 14, the administrator can replace devices, update data limits, change filter groups, change nicknames for devices, suspend devices, un-suspend devices, export devices to other accounts, etc.

While the present invention has been illustrated and described herein in terms of a preferred embodiment and several alternatives, it is to be understood that the techniques described herein can have a multitude of additional uses and applications. Accordingly, the invention should not be limited to just the particular description and various drawing figures contained in this specification that merely illustrate a preferred embodiment and application of the principles of the invention.

What is claimed is:

1. A system for managing one or more devices, comprising:
one or more device accounts for each of the one or more devices, the one or more device accounts being configured to have units of measure added to and decremented from the one or more devices based on one or more activities associated with the one or more devices; and
a master account associated with the one or more devices and each of the one or more device accounts, the master account being configured to have the units of measure added to and decremented from the master account based on the one or more activities, the master account including:
a policy decider configured to store a list of policies that control the one or more activities, to decide to accept or deny a request sent to or from the one or more devices to perform the one or more activities, and to provide a decision to accept or deny the request based on the list of policies; and
a policy enforcer configured to enforce the decision by the policy decider as to whether the request has been accepted or denied by taking one or more actions consistent with the decision.

2. The system as recited in claim 1, wherein the one or more activities include transactions and resources, and wherein the units of measure include units of measure based on the transactions and units of measure based on the resources.

3. The system as recited in claim 2, wherein the resources include data sent to or from the one or more devices.

4. The system as recited in claim 1, wherein the policy decider is configured to provide the decision in real-time for a first group of the one or more activities and to not provide the decision in real-time for a second group of the one or more activities.

5. The system as recited in claim 4, wherein the first group includes transactions, wherein the units of measure include units of measure based on the transactions.

6. The system as recited in claim 4, wherein the second group includes transactions, wherein the units of measure include units of measure based on the transactions.

7. The system as recited in claim 1, wherein the policy decider is configured to provide the decision in real-time.

8. The system as recited in claim 1, wherein the one or more device accounts and the master account include limits.

9. The system as recited in claim 8, wherein the limits are based on time.

10. The system as recited in claim 8, wherein the limits are based on resources.

11. The system as recited in claim 8, wherein the limits are based on one or more locations of the one or more devices.

12. The system as recited in claim 11, wherein the limits control content and resources available to the one or more devices.

13. The system as recited in claim 1, wherein the one or more actions include filtering content sent to or from the one or more devices.

14. The system as recited in claim 13, wherein said filtering includes limiting a quantity of the content.

15. The system as recited in claim 13, wherein said filtering includes excluding the content.

16. The system as recited in claim 8, wherein the list of policies includes policies based on the limits, and wherein the decision by the policy decider denies the request if one of the limits will be exceeded by accepting the request.

17. The system as recited in claim 8, wherein the list of policies includes policies based on the limits, and wherein the decision by the policy decider denies the request if one of the limits has already been met or exceeded.

18. The system as recited in claim 8, wherein each of the one or more device accounts has a different limit.

19. The system as recited in claim 18, wherein the different limit is unrelated to a limit on the master account.

20. The system as recited in claim 18, where a total of the different limits is not equal to a limit on the master account.

21. The system as recited in claim 18, wherein in response to the one or more actions taken by the policy enforcer the one or more device accounts are decremented by a first amount of the unit of measure and the master account is decremented by a second amount of the unit of measure.

22. The system as recited in claim 8, wherein the list of policies includes policies based on the limits, and wherein the one or more actions includes sending an alert to the master account.

23. The system as recited in claim 8, wherein the list of policies includes policies based on the limits, and wherein the one or more actions includes redirecting the one or more devices.

24. The system as recited in claim 1, wherein the units of measure added to the one or more devices are based on prior usage of the one or more devices.

25. The system as recited in claim 1, wherein the list of policies includes an eligibility limit for one or more users of the one or more devices.

26. The system as recited in claim 1, wherein the eligibility limit is determined by a government program.

* * * * *